(12) United States Patent
Ahamed

(10) Patent No.: US 12,465,357 B2
(45) Date of Patent: Nov. 11, 2025

(54) SURGICAL STAPLING DEVICE WITH DISPOSABLE CUTTING PLATE

(71) Applicant: Covidien LP, Mansfield, MA (US)

(72) Inventor: Syed Sarfraz Ahamed, Shanghai (CN)

(73) Assignee: Covidien LP, Mansfield, MA (US)

( * ) Notice: Subject to any disclaimer, the term of this patent is extended or adjusted under 35 U.S.C. 154(b) by 411 days.

(21) Appl. No.: 17/799,386

(22) PCT Filed: Feb. 14, 2020

(86) PCT No.: PCT/CN2020/075298
§ 371 (c)(1),
(2) Date: Aug. 12, 2022

(87) PCT Pub. No.: WO2021/159475
PCT Pub. Date: Aug. 19, 2021

(65) Prior Publication Data
US 2023/0072670 A1    Mar. 9, 2023

(51) Int. Cl.
*A61B 17/072* (2006.01)
*A61B 17/00* (2006.01)
*A61B 90/00* (2016.01)

(52) U.S. Cl.
CPC .... *A61B 17/072* (2013.01); *A61B 2017/0053* (2013.01); *A61B 2017/07221* (2013.01); *A61B 2017/07228* (2013.01); *A61B 2017/07271* (2013.01); *A61B 2017/07285* (2013.01); *A61B 2090/038* (2016.02)

(58) Field of Classification Search
CPC ... A61B 17/072; A61B 17/105; A61B 17/115; A61B 2017/07221; A61B 2017/07214; A61B 2017/07228; A61B 2017/07271; A61B 2017/07285; A61B 2017/0053; A61B 2017/0688; A61B 2017/00477; A61B 90/03; A61B 2090/038
USPC .............................. 227/176.1, 180.1, 181.1
See application file for complete search history.

(56) References Cited

U.S. PATENT DOCUMENTS

| | | | |
|---|---|---|---|
| 1,158,111 | A | 10/1915 | Ahlheim |
| 2,891,250 | A | 6/1959 | Hirata |
| 3,080,564 | A | 3/1963 | Strekopitov et al. |

(Continued)

FOREIGN PATENT DOCUMENTS

| | | |
|---|---|---|
| CN | 201361065 Y | 12/2009 |
| CN | 102579096 A | 7/2012 |

(Continued)

OTHER PUBLICATIONS

Extended European Search Report dated Oct. 5, 2023, issued in corresponding EP Appln. No. 20918195, 8 pages.

(Continued)

*Primary Examiner* — Thanh K Truong
*Assistant Examiner* — Linda J. Hodge

(57) ABSTRACT

A surgical stapling device (10) includes an anvil (22) and a reload assembly (50) that includes a cartridge assembly (20) and a cutting plate (54). The reload assembly (50) is removably coupled to the stapling device (10) to facilitate replacement of the cartridge assembly (20) and the cutting plate (54) on the stapling device (10). In certain aspects of the disclosure, the reload assembly (50) also includes a shipping cap (52) that is supported on the cartridge assembly (20) and supports the cutting plate (54).

14 Claims, 13 Drawing Sheets

(56) References Cited

U.S. PATENT DOCUMENTS

| | | | |
|---|---|---|---|
| 3,252,643 A | 5/1966 | Strekopov et al. | |
| 3,269,630 A | 8/1966 | Fleischer | |
| 3,275,211 A | 9/1966 | Hirsch et al. | |
| 3,315,863 A | 4/1967 | O'Dea | |
| 3,494,533 A | 2/1970 | Green et al. | |
| 3,589,589 A | 6/1971 | Akopov | |
| 3,692,224 A | 9/1972 | Astafiev et al. | |
| 3,795,034 A | 3/1974 | Strekopytov et al. | |
| 3,822,818 A | 7/1974 | Strekopytov et al. | |
| 3,935,981 A | 2/1976 | Akopov et al. | |
| 3,949,923 A | 4/1976 | Akopov et al. | |
| 4,047,654 A | 9/1977 | Alvarado | |
| 4,216,891 A | 8/1980 | Behlke | |
| 4,244,372 A | 1/1981 | Kapitanov et al. | |
| 4,296,881 A | 10/1981 | Lee | |
| 4,305,539 A | 12/1981 | Korolkov et al. | |
| 4,354,628 A | 10/1982 | Green | |
| 4,378,901 A | 4/1983 | Akopov et al. | |
| 4,383,634 A | 5/1983 | Green | |
| 4,402,444 A | 9/1983 | Green | |
| 4,415,112 A | 11/1983 | Green | |
| D273,513 S | 4/1984 | Spreckelmeier | |
| 4,442,964 A | 4/1984 | Becht | |
| 4,470,533 A | 9/1984 | Schuler | |
| 4,475,679 A | 10/1984 | Fleury, Jr. | |
| 4,485,811 A | 12/1984 | Chernousov et al. | |
| 4,506,670 A | 3/1985 | Crossley | |
| 4,506,671 A | 3/1985 | Green | |
| 4,508,253 A | 4/1985 | Green | |
| 4,522,327 A | 6/1985 | Korthoff et al. | |
| 4,527,724 A | 7/1985 | Chow et al. | |
| 4,530,453 A | 7/1985 | Green | |
| 4,550,870 A | 11/1985 | Krumme et al. | |
| 4,566,620 A | 1/1986 | Green et al. | |
| 4,568,009 A | 2/1986 | Green | |
| 4,573,622 A | 3/1986 | Green et al. | |
| 4,580,712 A | 4/1986 | Green | |
| 4,585,153 A | 4/1986 | Failla et al. | |
| 4,589,582 A | 5/1986 | Bilotti | |
| 4,602,634 A | 7/1986 | Barkley | |
| 4,605,001 A | 8/1986 | Rothfuss et al. | |
| 4,605,004 A | 8/1986 | Di Giovanni et al. | |
| 4,606,344 A | 8/1986 | Di Giovanni | |
| 4,606,345 A | 8/1986 | Dorband et al. | |
| 4,607,636 A | 8/1986 | Kula et al. | |
| 4,612,933 A | 9/1986 | Brinkerhoff et al. | |
| 4,617,928 A | 10/1986 | Alfranca | |
| 4,632,290 A | 12/1986 | Green et al. | |
| 4,665,916 A | 5/1987 | Green | |
| 4,684,051 A | 8/1987 | Akopov et al. | |
| 4,714,187 A | 12/1987 | Green | |
| 4,715,520 A | 12/1987 | Roehr, Jr. et al. | |
| 4,728,020 A | 3/1988 | Green et al. | |
| 4,767,044 A | 8/1988 | Green | |
| 4,788,978 A | 12/1988 | Strekopytov et al. | |
| 4,802,614 A | 2/1989 | Green et al. | |
| 4,805,823 A | 2/1989 | Rothfuss | |
| 4,819,853 A | 4/1989 | Green | |
| 4,848,637 A | 7/1989 | Pruitt | |
| 4,869,414 A | 9/1989 | Green et al. | |
| 4,881,544 A | 11/1989 | Green et al. | |
| 4,881,545 A | 11/1989 | Isaacs et al. | |
| 4,915,100 A * | 4/1990 | Green | A61B 17/072 227/176.1 |
| 4,930,503 A | 6/1990 | Pruitt | |
| 4,938,408 A | 7/1990 | Bedi et al. | |
| 4,941,623 A | 7/1990 | Pruitt | |
| 4,951,861 A | 8/1990 | Schulze et al. | |
| 4,964,559 A | 10/1990 | Deniega et al. | |
| 5,005,754 A | 4/1991 | Van Overloop | |
| 5,018,657 A | 5/1991 | Pedlick et al. | |
| 5,071,052 A | 12/1991 | Rodak et al. | |
| 5,100,042 A | 3/1992 | Gravener et al. | |
| 5,116,349 A | 5/1992 | Aranyi | |
| 5,137,198 A | 8/1992 | Nobis et al. | |
| 5,172,845 A | 12/1992 | Tejeiro | |
| 5,190,203 A | 3/1993 | Rodak | |
| 5,219,111 A * | 6/1993 | Bilotti | A61B 17/072 227/19 |
| 5,240,163 A | 8/1993 | Stein et al. | |
| 5,344,060 A | 9/1994 | Gravener et al. | |
| 5,368,599 A | 11/1994 | Hirsch et al. | |
| 5,405,073 A | 4/1995 | Porter | |
| 5,413,267 A | 5/1995 | Solyntjes et al. | |
| 5,439,155 A | 8/1995 | Viola | |
| 5,452,836 A | 9/1995 | Huitema et al. | |
| 5,458,279 A | 10/1995 | Plyley | |
| 5,462,215 A | 10/1995 | Viola et al. | |
| 5,464,144 A | 11/1995 | Guy et al. | |
| 5,465,894 A | 11/1995 | Clark et al. | |
| 5,470,006 A | 11/1995 | Rodak | |
| 5,470,008 A | 11/1995 | Rodak | |
| 5,470,009 A | 11/1995 | Rodak | |
| 5,497,934 A | 3/1996 | Brady et al. | |
| 5,503,320 A | 4/1996 | Webster et al. | |
| 5,509,596 A | 4/1996 | Green et al. | |
| 5,542,594 A | 8/1996 | McKean et al. | |
| 5,547,117 A | 8/1996 | Hamblin et al. | |
| 5,558,266 A | 9/1996 | Green et al. | |
| 5,571,285 A | 11/1996 | Chow et al. | |
| 5,579,978 A | 12/1996 | Green et al. | |
| 5,580,067 A | 12/1996 | Hamblin et al. | |
| 5,603,443 A | 2/1997 | Clark et al. | |
| 5,605,272 A | 2/1997 | Witt et al. | |
| 5,605,273 A | 2/1997 | Hamblin et al. | |
| 5,607,094 A | 3/1997 | Clark et al. | |
| 5,615,820 A | 4/1997 | Viola | |
| 5,641,111 A * | 6/1997 | Ahrens | A61B 17/072 227/19 |
| 5,678,748 A | 10/1997 | Plyley et al. | |
| 5,697,543 A | 12/1997 | Burdorf | |
| 5,706,997 A | 1/1998 | Green et al. | |
| 5,706,998 A | 1/1998 | Plyley et al. | |
| 5,732,871 A | 3/1998 | Clark et al. | |
| 5,735,445 A | 4/1998 | Vidal et al. | |
| 5,794,834 A | 8/1998 | Hamblin et al. | |
| 5,810,240 A * | 9/1998 | Robertson | A61B 17/072 227/176.1 |
| 5,855,311 A | 1/1999 | Hamblin et al. | |
| 5,878,937 A | 3/1999 | Green et al. | |
| 5,893,506 A | 4/1999 | Powell | |
| 5,894,979 A | 4/1999 | Powell | |
| 5,964,394 A | 10/1999 | Robertson | |
| 6,045,560 A | 4/2000 | McKean et al. | |
| 6,638,285 B2 | 10/2003 | Gabbay | |
| 6,805,273 B2 | 10/2004 | Bilotti et al. | |
| 6,817,508 B1 | 11/2004 | Racenet et al. | |
| 6,988,650 B2 | 1/2006 | Schwemberger et al. | |
| 7,070,083 B2 | 7/2006 | Jankowski | |
| 7,134,587 B2 | 11/2006 | Schwemberger et al. | |
| 7,147,139 B2 | 12/2006 | Schwemberger et al. | |
| 7,147,140 B2 | 12/2006 | Wukusick et al. | |
| 7,204,404 B2 | 4/2007 | Nguyen et al. | |
| 7,207,472 B2 | 4/2007 | Wukusick et al. | |
| 7,210,609 B2 | 5/2007 | Leiboff et al. | |
| 7,237,708 B1 | 7/2007 | Guy et al. | |
| 7,275,674 B2 | 10/2007 | Racenet et al. | |
| RE40,237 E | 4/2008 | Bilotti et al. | |
| 7,407,076 B2 | 8/2008 | Racenet et al. | |
| 7,431,190 B2 | 10/2008 | Hoffman | |
| 7,522,854 B2 | 4/2009 | Kinouchi et al. | |
| 7,549,563 B2 | 6/2009 | Mather et al. | |
| 7,568,605 B2 | 8/2009 | Kruszynski | |
| 7,641,092 B2 | 1/2010 | Kruszynski et al. | |
| 7,717,312 B2 | 5/2010 | Beetel | |
| 7,731,073 B2 | 6/2010 | Wixey et al. | |
| 7,735,704 B2 | 6/2010 | Bilotti | |
| 7,766,207 B2 | 8/2010 | Mather et al. | |
| 7,810,690 B2 | 10/2010 | Bilotti et al. | |
| 7,828,188 B2 | 11/2010 | Jankowski | |
| 7,886,953 B2 | 2/2011 | Schwemberger et al. | |
| 8,016,176 B2 | 9/2011 | Kasvikis et al. | |
| 8,029,520 B2 | 10/2011 | Korvick et al. | |
| 8,033,439 B2 | 10/2011 | Racenet et al. | |

(56) References Cited

U.S. PATENT DOCUMENTS

| | | |
|---|---|---|
| 8,070,038 B2 | 12/2011 | Kostrzewski |
| 8,231,041 B2 | 7/2012 | Marczyk et al. |
| 8,292,904 B2 | 10/2012 | Popovic et al. |
| 8,328,064 B2 | 12/2012 | Racenet et al. |
| 8,360,296 B2 | 1/2013 | Zingman |
| 8,424,738 B2 | 4/2013 | Kasvikis |
| 8,499,994 B2 | 8/2013 | D'Arcangelo |
| 8,596,515 B2 | 12/2013 | Okoniewski |
| 8,627,994 B2 | 1/2014 | Zemlok et al. |
| 8,646,673 B2 | 2/2014 | Bilotti et al. |
| 8,757,467 B2 | 6/2014 | Racenet et al. |
| 8,936,185 B2 | 1/2015 | Racenet et al. |
| 8,955,732 B2 | 2/2015 | Zemlok et al. |
| 8,967,446 B2 | 3/2015 | Beardsley et al. |
| 9,022,273 B1 | 5/2015 | Marczyk et al. |
| 9,125,651 B2 | 9/2015 | Mandakolathur Vasudevan et al. |
| 9,192,382 B2 | 11/2015 | Kostrzewski |
| 9,192,387 B1 | 11/2015 | Holsten et al. |
| 9,480,474 B2 | 11/2016 | Ji et al. |
| 9,566,066 B2 | 2/2017 | Kasvikis |
| 9,579,102 B2 | 2/2017 | Holsten et al. |
| 9,655,619 B2 | 5/2017 | Zhang et al. |
| 9,662,111 B2 | 5/2017 | Holsten et al. |
| 9,668,736 B2 | 6/2017 | Holsten et al. |
| 9,675,349 B2 | 6/2017 | Holsten et al. |
| 9,675,350 B2 | 6/2017 | Holsten et al. |
| 9,675,356 B2 | 6/2017 | Racenet et al. |
| 9,814,460 B2 | 11/2017 | Kimsey et al. |
| 9,888,923 B2 | 2/2018 | Chen et al. |
| 9,962,159 B2 | 5/2018 | Heinrich et al. |
| 10,004,504 B2 | 6/2018 | Bryant |
| 10,085,754 B2 | 10/2018 | Sniffin et al. |
| 10,194,913 B2 | 2/2019 | Nalagatla et al. |
| 2004/0164123 A1 | 8/2004 | Racenet et al. |
| 2005/0139636 A1 | 6/2005 | Schwemberger et al. |
| 2005/0247752 A1 | 11/2005 | Kelly et al. |
| 2005/0247753 A1 | 11/2005 | Kelly et al. |
| 2006/0163312 A1 | 7/2006 | Viola et al. |
| 2007/0187456 A1 | 8/2007 | Viola et al. |
| 2010/0048988 A1 | 2/2010 | Pastorelli et al. |
| 2011/0101066 A1* | 5/2011 | Farascioni ....... A61B 17/07207 227/175.2 |
| 2012/0145714 A1* | 6/2012 | Farascioni ............ A61B 50/30 220/780 |
| 2013/0206813 A1 | 8/2013 | Nalagatla |
| 2016/0192927 A1* | 7/2016 | Kostrzewski ...... A61B 17/0643 227/176.1 |
| 2016/0249914 A1 | 9/2016 | Zhang et al. |
| 2016/0249923 A1 | 9/2016 | Hodgkinson et al. |
| 2016/0270784 A1 | 9/2016 | Wheeler et al. |
| 2016/0270790 A1 | 9/2016 | Jankowski |
| 2016/0270793 A1 | 9/2016 | Carter et al. |
| 2016/0278779 A1 | 9/2016 | Jankowski |
| 2017/0014134 A1 | 1/2017 | Chen et al. |
| 2017/0027571 A1 | 2/2017 | Nalagatla et al. |
| 2017/0027572 A1 | 2/2017 | Nalagatla et al. |
| 2017/0027573 A1 | 2/2017 | Nalagatla et al. |
| 2017/0027574 A1 | 2/2017 | Nalagatla et al. |
| 2017/0128149 A1 | 5/2017 | Heinrich et al. |
| 2017/0238923 A1 | 8/2017 | Holsten et al. |
| 2017/0238924 A1 | 8/2017 | Holsten et al. |
| 2017/0265861 A1 | 9/2017 | Holsten et al. |
| 2018/0008261 A1 | 1/2018 | Racenet et al. |
| 2018/0049739 A1 | 2/2018 | Kasvikis |
| 2018/0153544 A1 | 6/2018 | Maddur Shankarsetty et al. |
| 2018/0221024 A1 | 8/2018 | Heinrich et al. |
| 2020/0337698 A1* | 10/2020 | Simms ................ A61B 17/072 |

FOREIGN PATENT DOCUMENTS

| | | |
|---|---|---|
| CN | 102579096 B | 4/2014 |
| CN | 108472040 A | 8/2018 |
| CN | 108472040 B | 6/2021 |
| JP | 2005193043 A | 7/2005 |
| JP | 2008512155 A | 4/2008 |
| WO | 2017203682 A1 | 11/2017 |

OTHER PUBLICATIONS

EP Communication dated Oct. 24, 2023, issued in corresponding EP Application No. 20918195, 1 page.

Japanese Office Action dated Oct. 20, 2023, issued in corresponding JP Application No. 2022-548892, 3 pages.

International Search Report for Application No. PCT/CN2020/075298 dated Nov. 25, 2020.

Written Opinion for Application No. PCT/CN2020/075298 dated Nov. 18, 2020.

* cited by examiner

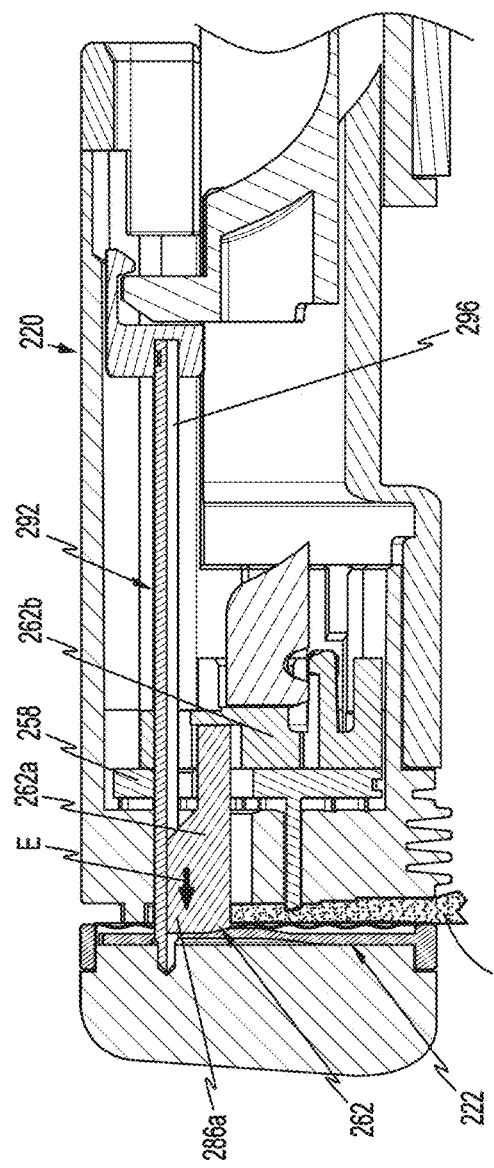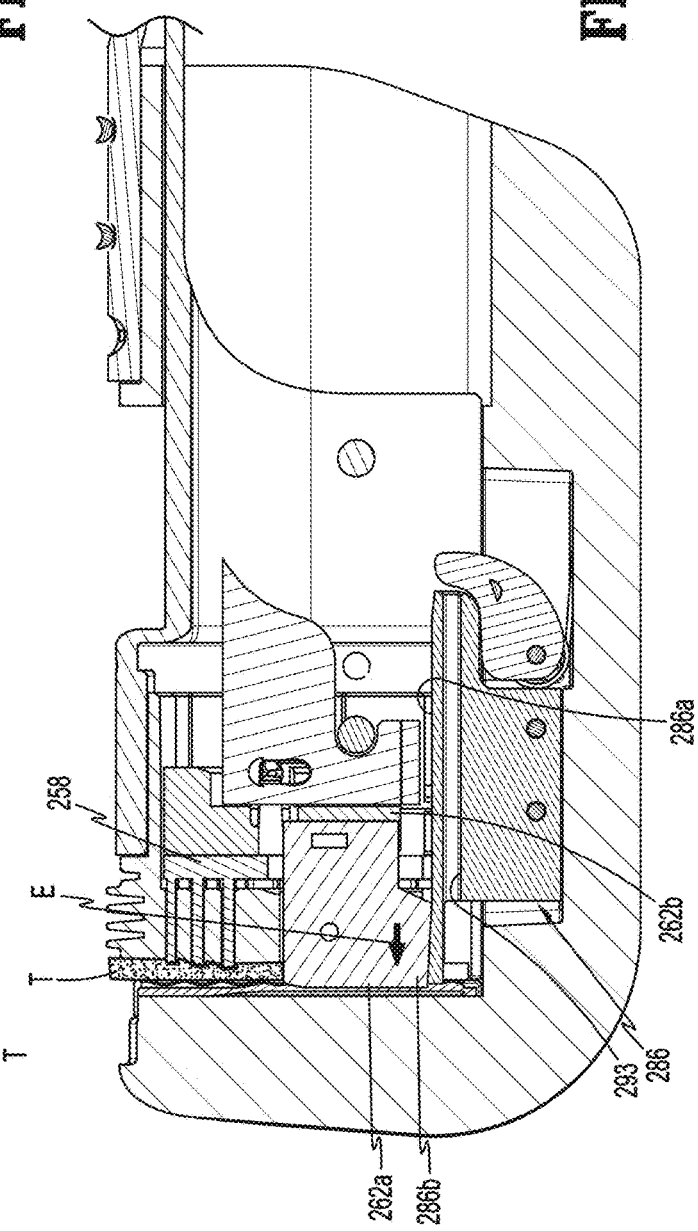

SURGICAL STAPLING DEVICE WITH DISPOSABLE CUTTING PLATE

FIELD

The technology is generally related to surgical stapling devices and, more particularly, to surgical stapling devices having a disposable reload assembly including a cutting plate.

BACKGROUND

Surgical stapling devices for applying rows of staples through compressed living tissue are known in the art and are commonly used for closure of tissue or organs prior to transection or resection of the tissue and for occlusion of the organs during thoracic or abdominal procedures. Such stapling devices sometimes include a knife for transecting or resecting the tissue or organs simultaneously with application of the rows of staples to the tissue.

Typically, the stapling devices include a tool assembly having an anvil assembly and a cartridge or reload assembly, a drive member or pusher, and an approximation assembly for moving the tool assembly between spaced and clamped positions. In certain stapling devices, the reload assembly includes a knife assembly having a cutting blade that is movable into engagement with the anvil assembly to cut tissue. In some stapling devices, the anvil assembly includes a cutting plate that is engaged by the cutting blade when the knife assembly is actuated. The cutting plate provides a surface against which tissue can be compressed to more effectively cut through tissue. Engagement between the cutting blade and the cutting plate may cause the cutting plate to deform or fracture.

In transverse type stapling devices, the cartridge assembly forms part of a reload assembly that can be replaced after each firing of the stapling device to facilitate reuse of the stapling device. In such devices, the cutting plate is included as part of the anvil assembly and is not replaced with the reload assembly. As such, the cutting plate which may be cut, deformed, or fractured during a previous firing of the stapling device may not function in its intended manner during subsequent firings of the stapling device.

SUMMARY

In aspects, this disclosure generally relate to a surgical stapling device including an anvil and a reload assembly that includes a cartridge assembly and a cutting plate. The reload assembly is removably coupled to the stapling device to facilitate replacement of the cartridge assembly and the cutting plate on the stapling device after each firing of the stapling device. In certain aspects of the disclosure, the reload assembly also includes a shipping cap that is supported on the cartridge assembly and supports the cutting plate.

One aspect of the disclosure is directed to a stapling device including a frame, an approximation assembly, an anvil, and a reload assembly. The frame defines a longitudinal axis and includes a distal transverse portion, a proximal transverse portion, and a central longitudinal portion extending between the distal and proximal transverse portions. The distal transverse portion of the frame defines a channel. The approximation assembly is supported on the frame and includes a clamp slide assembly having a distal portion defining a pocket. The clamp slide assembly is movable in relation to the frame from a retracted position to an advanced position. The anvil is fixedly secured to the distal transverse portion of the frame in a position over the channel to define a channel inlet. The reload assembly includes a cartridge assembly and a cutting plate supported on the cartridge assembly. The reload assembly is removably supported on the stapling device to position the cartridge assembly in the pocket of the clamp slide assembly and to position the cutting plate in the channel of the distal transverse portion of the frame.

In another aspect of the disclosure, a stapling device includes a frame, an approximation assembly, an anvil, and a reload assembly. The frame defines a longitudinal axis and includes a distal transverse portion, a proximal transverse portion, and a central longitudinal portion extending between the distal and proximal transverse portions. The distal transverse portion of the frame defines a channel. The approximation assembly is supported on the frame and includes a clamp slide assembly having a distal portion defining a pocket. The clamp slide assembly is movable in relation to the frame from a retracted position to an advanced position. The anvil is fixedly secured to the distal transverse portion of the frame over the channel to define a channel inlet. The reload assembly includes a cartridge assembly, a shipping cap, and a cutting plate. The shipping cap is supported on the cartridge assembly and the cutting plate is supported on the shipping cap. The reload assembly is removably supported on the stapling device to position the cartridge assembly in the pocket of the clamp slide assembly and to position the cutting plate in the channel of the distal transverse portion of the frame.

In aspects of the disclosure the cartridge assembly includes a cartridge body, a pusher, and a knife assembly and defines rows of staple pockets and a knife slot positioned between the rows of staple pockets.

In some aspects of the disclosure the cartridge assembly includes a staple supported in each of the staple pockets.

In certain aspects of the disclosure the reload assembly includes a shipping cap that is supported on the cartridge assembly and is positioned over the rows of staple pockets to prevent the staples from being ejected from the rows of staple pockets.

In aspects of the disclosure the shipping cap includes a distal surface having a protrusion and the cutting plate defines a first opening, wherein the protrusion is received in the first opening to support the cutting plate on the shipping cap.

In some aspects of the disclosure the shipping cap includes resilient fingers defining a guide channel that is positioned to receive the distal transverse portion of the frame during installation of the reload assembly onto the clamp slide assembly to guide the cutting plate into the channel inlet.

In certain aspects of the disclosure the cartridge assembly includes a cutting plate removal pin that is movable from a retracted position disengaged from the cutting plate to an advanced position engaged with the cutting plate, wherein in the advanced position of the cutting plate removal pin, removal of the cartridge assembly from the clamp slide assembly effects removal of the cutting plate from the channel of the distal transverse portion of the frame.

In aspects of the disclosure the pusher is movable from a retracted position to an advanced position within the cartridge body to eject the staples from the cartridge body.

In some aspects of the disclosure the pusher is positioned to engage the cutting plate removal pin as the pusher is moved from its retracted position to its advanced position to move the cutting plate removal pin from its retracted position to its advanced position.

In certain aspects of the disclosure the cutting plate defines a second opening that receives the cutting plate removal pin when the cutting plate removal pin is in its advanced position.

In aspects of the disclosure the stapling device includes a handle assembly and the frame extends distally from the handle assembly.

In some aspects of the disclosure the distal and proximal transverse portions are curved along an axis transverse to the longitudinal axis.

In certain aspects of the disclosure movement of the clamp slide assembly from its retracted position to its advanced position effects movement of the cartridge assembly in relation to the anvil from an open position to a clamped position.

In another aspect, this disclosure is directed to a stapling device including a frame, an anvil, and a reload assembly. The frame defines a longitudinal axis and includes a distal transverse portion, a proximal transverse portion, and a central longitudinal portion extending between the distal and proximal transverse portions. The anvil is fixedly secured to the distal transverse portion of the frame over the channel to define a channel inlet. The reload assembly includes a cartridge assembly having a cartridge body, a pusher, a knife assembly including a knife blade, and an alignment pin assembly including an alignment pin. The cartridge body defines rows of staple pockets and a knife slot positioned between the rows of staple pockets. The alignment pin defines a longitudinal slot. The knife assembly is movable from a retracted position recessed within the cartridge body to an advanced position extending from the knife slot. The knife blade includes a first lateral extension that is received in the longitudinal slot of the alignment pin as the knife assembly is moved from its retracted position to its advanced position.

In aspects of the disclosure the stapling device includes a guide plate that is supported on the central longitudinal portion of the frame and defines a guide surface. The knife blade includes a second lateral extension that is positioned to engage and move along the guide surface of the guide plate as the knife assembly is moved from its retracted positon to its advanced position.

In some aspects of the disclosure the guide surface has a distal portion that is angled towards the cartridge assembly in a distal direction.

Other features of the disclosure will be appreciated from the following description.

BRIEF DESCRIPTION OF DRAWINGS

Various aspects of the disclosure are described herein below with reference to the drawings, wherein:

FIG. 23 is a cross-sectional view taken along section lines 23-23 of FIG. 22; and FIG. 24 is a cross-sectional view taken along section lines 24-24 of FIG. 22.

DETAILED DESCRIPTION

Figure 1:
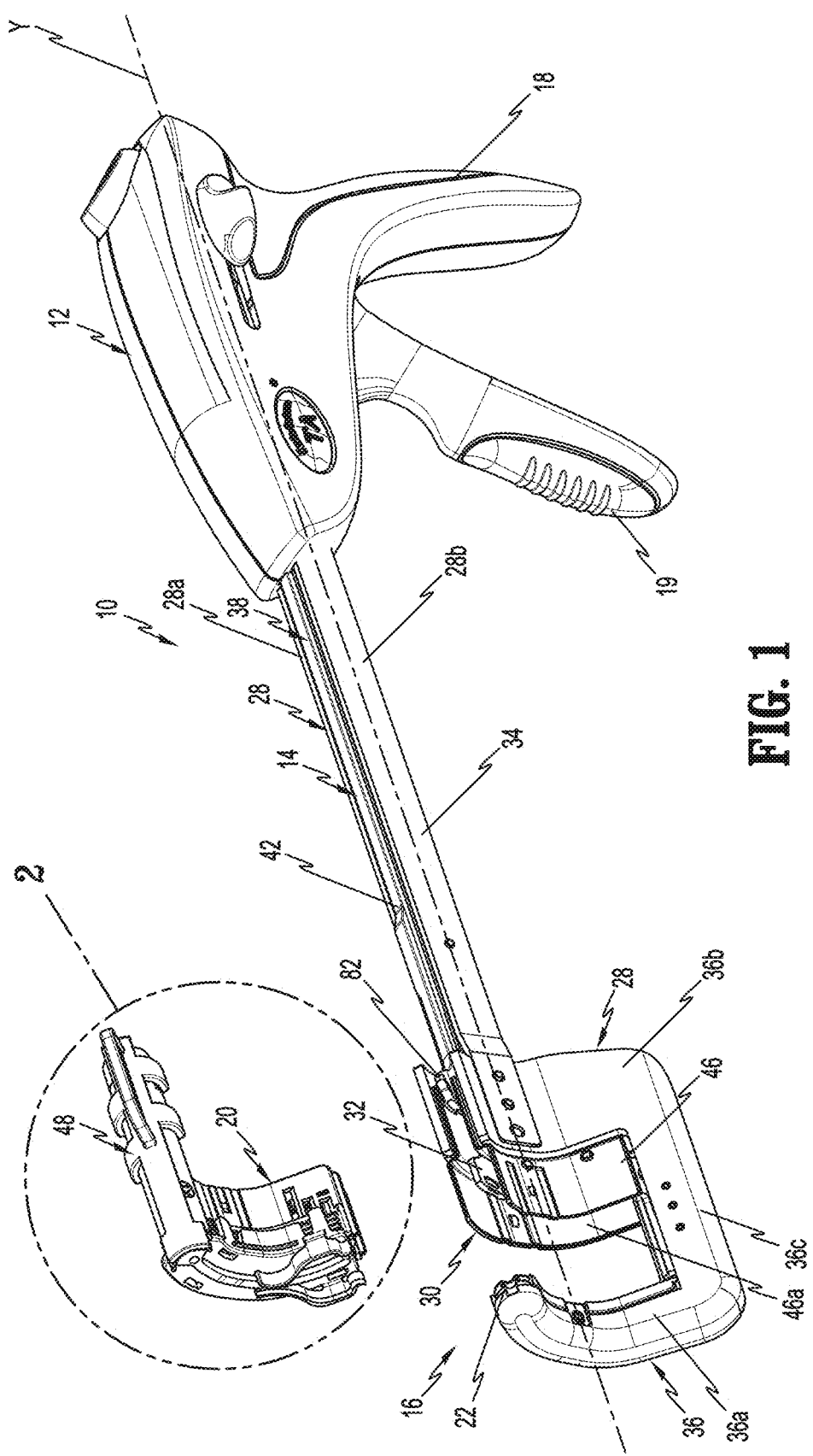
FIG. 1 is a perspective view of a surgical stapling device according to certain aspects of the disclosure with a reload assembly separated from a clamp slide assembly of the stapling device and a shipping cap coupled to the reload assembly.

The disclosed stapling devices will now be described in detail with reference to the drawings in which like reference numerals designate identical or corresponding elements in each of the several views. However, it is to be understood that the aspects of the disclosure are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure. In addition, directional terms such as front, rear, upper, lower, top, bottom, distal, proximal, and similar terms are used to assist in understanding the description and are not intended to limit the disclosure.

In this description, the term "proximal" is used generally to refer to that portion of the device that is closer to a clinician, while the term "distal" is used generally to refer to that portion of the device that is farther from the clinician. In addition, the term "endoscopic" is used generally used to refer to endoscopic, laparoscopic, arthroscopic, and/or any other procedure conducted through a small diameter incision or cannula. Further, the term "clinician" is used generally to refer to medical personnel including doctors, nurses, and support personnel.

The disclosed surgical stapling devices include a tool assembly having an anvil and a reload assembly. The reload assembly includes a cartridge assembly, a shipping cap, and a cutting plate releasably coupled to the shipping cap. The cartridge assembly includes a knife blade and an alignment pin assembly. When the reload assembly is installed onto the tool assembly of the stapling device, the cutting plate is inserted into the anvil to provide a cutting surface for the knife blade of the cartridge assembly. The alignment pin assembly is movable into engagement with the shipping cap such that the cutting plate is removed from the anvil when the reload assembly is removed from the stapling device. When a new reload assembly is installed onto the stapling device, a new cutting plate is inserted into the anvil.

Figure 2:
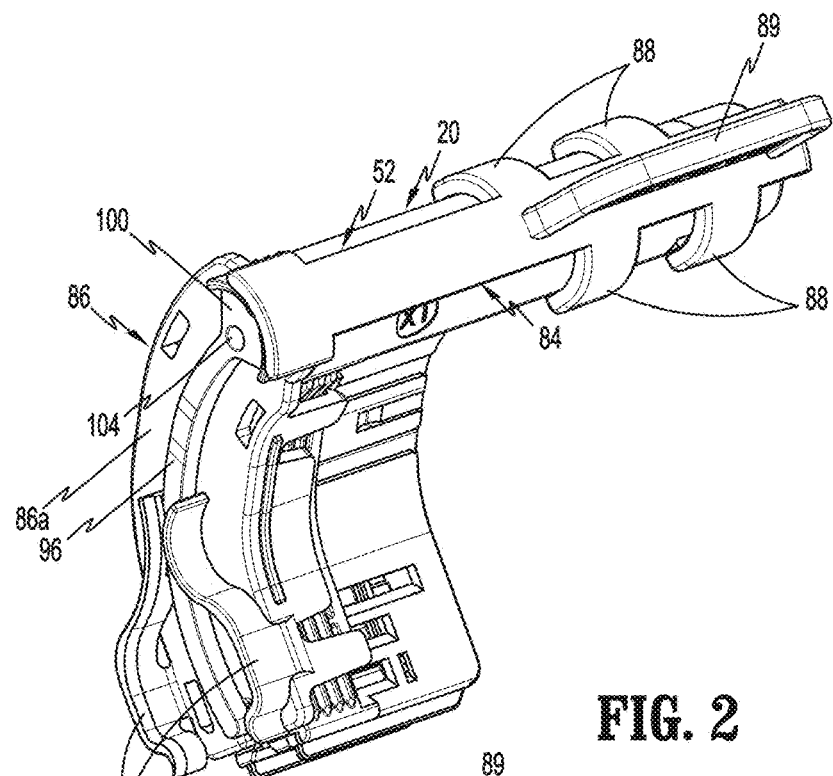
FIG. 2 is an enlarged view of the indicated area of detail of FIG. 1.
Figure 10:
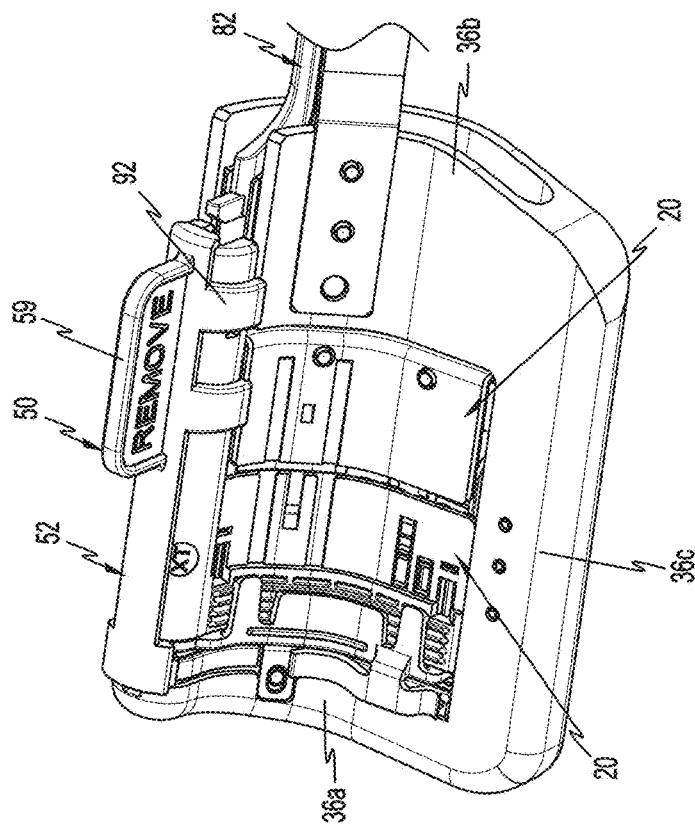
FIG. 10 is a side perspective view of the distal portion of the stapling device shown in FIG. 1 with the reload assembly partially installed onto the clamp slide assembly.

FIGS. 1 and 2 illustrate an exemplary surgical stapling device shown generally as stapling device 10. The stapling device 10 includes a handle assembly 12, an elongate body 14 that defines a longitudinal axis "Y", and a tool assembly 16. The handle assembly 12 includes a stationary handle 18 and a trigger 19 that is movable in relation to the stationary handle 18 to actuate the tool assembly 16. The tool assembly 16 includes a cartridge assembly 20 and an anvil 22 that define axes that are transverse to the longitudinal axis "Y" of the elongate body 14. The cartridge assembly 20 is supported on a distal end portion of the elongate body 14 and is movable in relation to the anvil 22 between an unclamped position and a clamped position (FIG. 10). In the clamped position, the cartridge assembly 20 is in juxtaposed alignment with the anvil 22. In aspects of the disclosure, the cartridge assembly 20 and the anvil 22 are curved along the transverse axes. Alternately, the cartridge assembly 20 and the anvil 22 can have angular or linear configurations.

The stapling device 10 includes a frame assembly 28 having a proximal portion (not shown) that forms a portion of the handle assembly 12, a central portion 34 that forms a portion of the elongate body 14, and a distal portion 36 that forms a portion of the tool assembly 16. The distal portion 36 of the frame assembly 28 includes a distal transverse portion 36a, a proximal transverse portion 36b, and a central longitudinal portion 36c. The frame assembly 28 includes frame members 28a and 28b that are secured together in spaced relation to each other to define a channel 42 (FIG. 1) between the frame members 28a and 28b.

The stapling device 10 includes an approximation mechanism 30 and a thrust bar 32 (FIG. 1). The approximation mechanism 30 includes a clamp slide assembly 38 that is supported within the channel 42 of the frame assembly 28 for movement between retracted and advanced positions. The clamp slide assembly 38 includes a distal end portion 46 that supports the cartridge assembly 20 when the cartridge assembly 20 is installed onto the stapling device 10. In aspects of the disclosure, the distal end portion 46 of the clamp slide assembly 38 defines a pocket 46a that receives the cartridge assembly 20.

The approximation mechanism 30 can be actuated via actuation of the trigger 19 to advance the clamp slide assembly within the channel 42 of the frame assembly 28 to move the cartridge assembly 20 in relation to the anvil 22 and move the stapling device 10 between its unclamped and clamped positions. In the clamped position of the stapling device 10 (FIG. 10), the cartridge assembly 20 is positioned in juxtaposed alignment with the anvil 22. The thrust bar 32 can be actuated, also via actuation of the trigger 19, to fire staples (not shown) from the cartridge assembly 20 into the anvil 22. For a more detailed description of the structure and operation of the handle assembly 12, the approximation mechanism 30, and the thrust bar 44, see U.S. Pat. No. 6,817,508 ("the '508 Patent").

Figure 3:
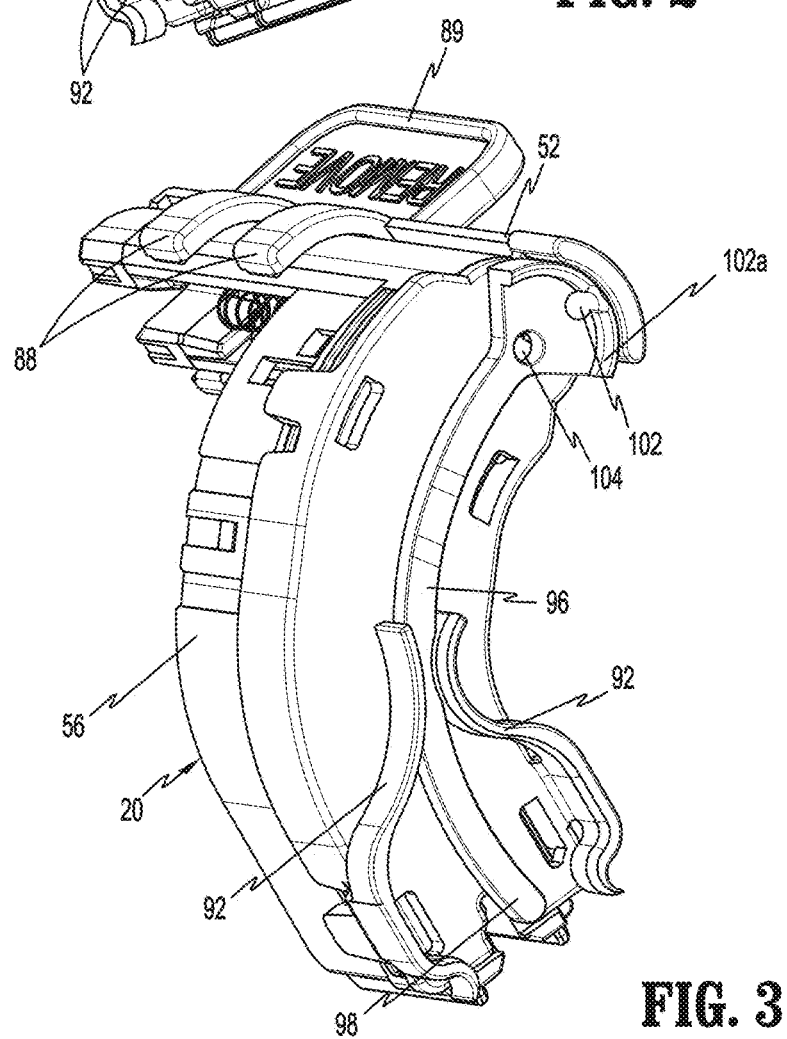
FIG. 3 is a perspective view from a distal end of the reload assembly and shipping cap of the stapling device shown in FIG. 1.
Figure 4:
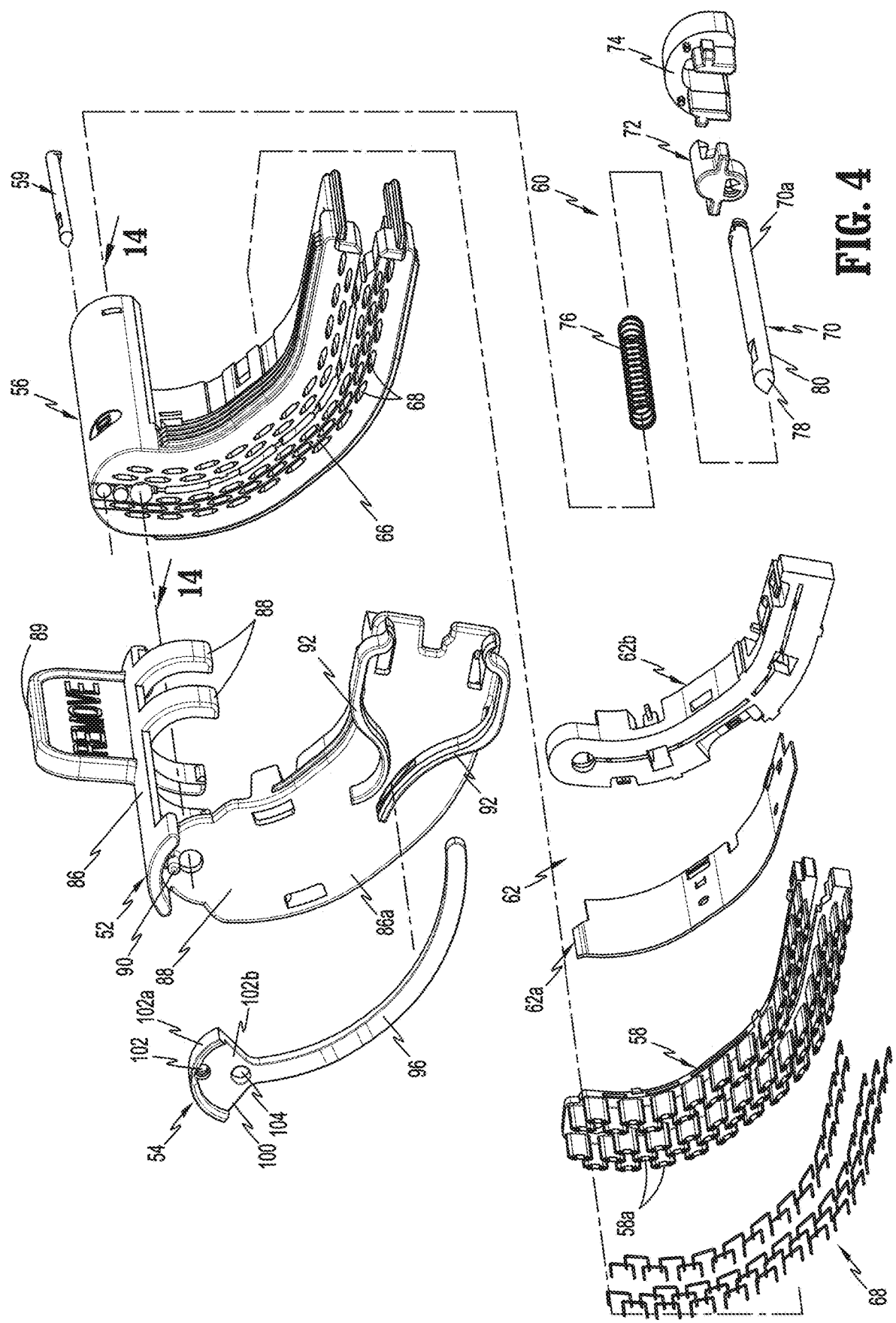
FIG. 4 is an exploded view of the reload assembly and shipping cap shown in FIG. 3.

FIGS. 2-4 illustrate a reload assembly 50 (FIG. 4) which includes the cartridge assembly 20, a shipping cap 52, and a cutting plate 54. The cartridge assembly 20 includes a cartridge body 56, a staple pusher 58, an alignment pin assembly 60, a cutting plate removal pin 59 (FIG. 4), and a knife assembly 62. The knife assembly 62 includes a knife blade 62a and a knife holder 62b. The cartridge body 56 defines rows of staple pockets 64 (FIG. 4) and a knife slot 66 that is positioned between the rows of staple pockets 64. Each of the staple pockets 64 receives a staple 68. The cartridge body 56 is open at its proximal end to receive the staple pusher 58 and the knife assembly 56 to facilitate movement of the staple pusher 58 and knife assembly 62 from retracted positions to advanced positions within the cartridge body 56 to effect stapling and resection or transection of tissue. The cutting plate removal pin 59 is movable from a retracted position to an advanced position (FIG. 14) to engage the cutting plate 54 to facilitate removal of the cutting plate 54 from the anvil 22 with the cartridge assembly 20 after the stapling device 10 has been fired. This operation is described in detail below.

The alignment pin assembly 60 (FIG. 4) includes an alignment pin 70, an alignment pin coupling member 72, a cap 74, and a biasing member 76. In certain aspects of the disclosure, the alignment pin 70 includes a substantially D-shaped body 70a having a tapered head portion 78, and a guide surface 80 that faces the knife blade 62a of the cartridge assembly 20 and engages the knife blade 62a as the knife blade 62a is advanced through the cartridge body 56 and the knife slot 66. The alignment pin assembly 60 is coupled to an alignment pin pusher 82 of the stapling device 10 to facilitate movement of the alignment pin 70 from a retracted position to an advanced position engaged with the anvil 22. For a more detailed description of the structure and operation of the alignment pin assembly 60, see the '508 Patent.

The shipping cap 52 (FIG. 2) is secured to the cartridge assembly 20 and includes a coupling portion 84 and a cap portion 86. The coupling portion 84 extends in a direction substantially parallel to the longitudinal axis "Y" of the stapling device 10 and includes semi-circular resilient arms 88 that receive and grip the cartridge body 56 to secure the shipping cap 52 to the cartridge body 56. The coupling portion also includes a grip member 89 that can be gripped and pulled to remove the shipping cap 52 from the cartridge assembly 20.

The cap portion 86 extends in a direction transverse to the coupling portion 84 and includes a distal surface 86a and a proximal surface (not shown). The proximal surface (not shown) is positioned to abut a distal surface 56a of the cartridge body 56 to retain the staples 68 within the cartridge body 56. The distal surface 86a of the cap portion 86a includes a protrusion 90 and resilient fingers 92. The protrusion 90 supports the cutting plate 54. The resilient fingers 92 define a guide channel for positioning the cutting plate 54 within the anvil 22 during installation of the reload assembly 50 onto the stapling device 10. The guide channel is positioned to receive the distal transverse portion 36a of the frame 28 when the reload assembly is installed onto the clamp slide assembly 30 to properly orient the reload assembly 50. The shipping cap 52 is removed from the cartridge body 56 of the cartridge assembly 20 by the clinician after the reload assembly 50 is installed onto the surgical device 10.

The cutting plate 54 includes a body 96 having a shape that corresponds to the shape of the cartridge assembly 20 and the anvil 22. The body 96 has an insertion end portion 98 and a support end portion 100. The support end portion 100 includes a cap 102a and a tapered body 102b that defines a first opening 102 and a second opening 104. The first opening 102 receives the protrusion 90 formed on the shipping cap 52 to support the 20 cutting plate 54 supported on the shipping cap 52. The first opening 102 also receives the cutting plate removal pin 59 to facilitate removal of the cutting plate 52 from the anvil 22 when the reload assembly 50 is removed from the stapling device 10. The second opening 104 receives the alignment pin 70 of the alignment pin assembly 60.

In aspects of the disclosure, the cutting plate 54 is formed from a plastic material such as a polyether ether ketone (PEEK) material, a polyoxymethylene (POM) material, or a polyphenylsulfone material (PPSU). In some aspects of the disclosure, the cutting plate 54 is formed by injection molding although other methods of manufacture are envisioned. The cutting plate 54 should be formed of a material that will deform locally and structurally upon engagement with the knife blade 62a. Local deformation of the cutting plate 54 ensures that no gap exists between the knife blade 62a and the surface of the cutting plate 52 to facilitate a clean cut through tissue. The structural deformation limits the firing force required to fire the stapling device 10.

Figure 5:
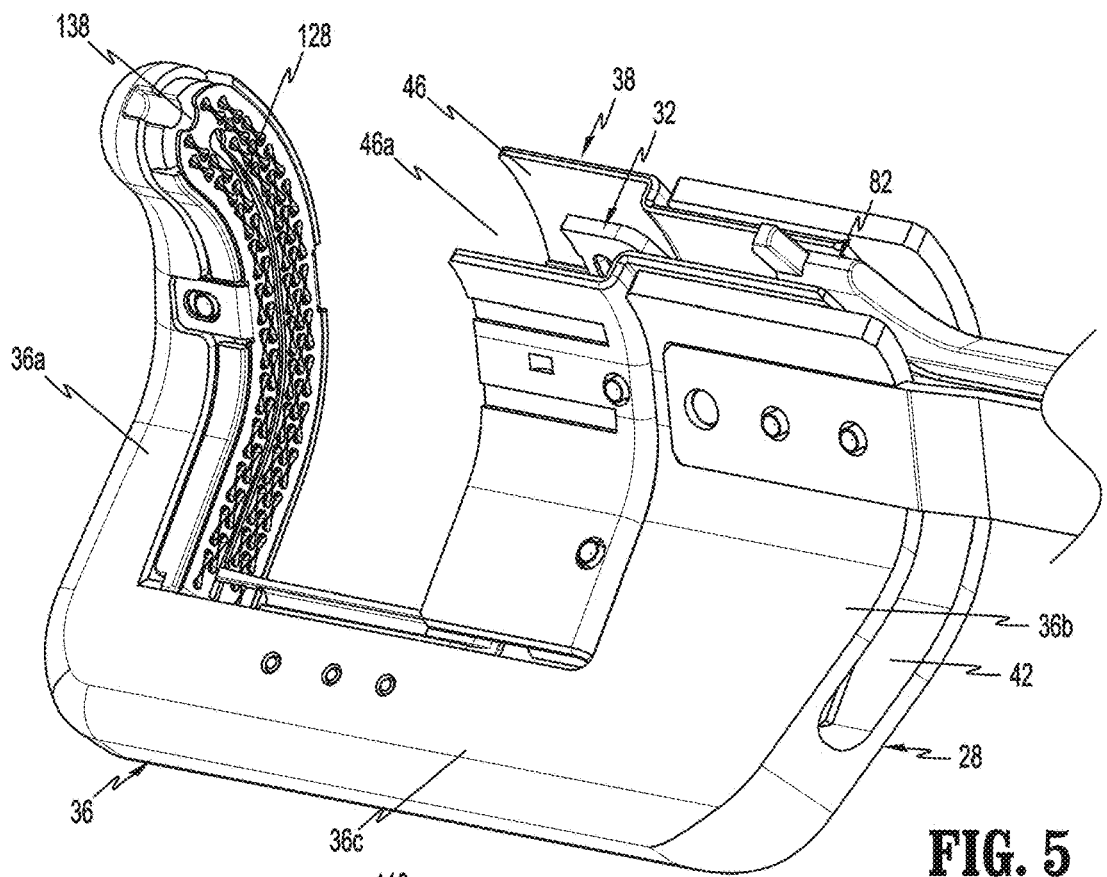
FIG. 5 is a side perspective view of a distal portion of the stapling device shown in FIG. 1 with the reload assembly removed from the clamp slide assembly.
Figure 6:
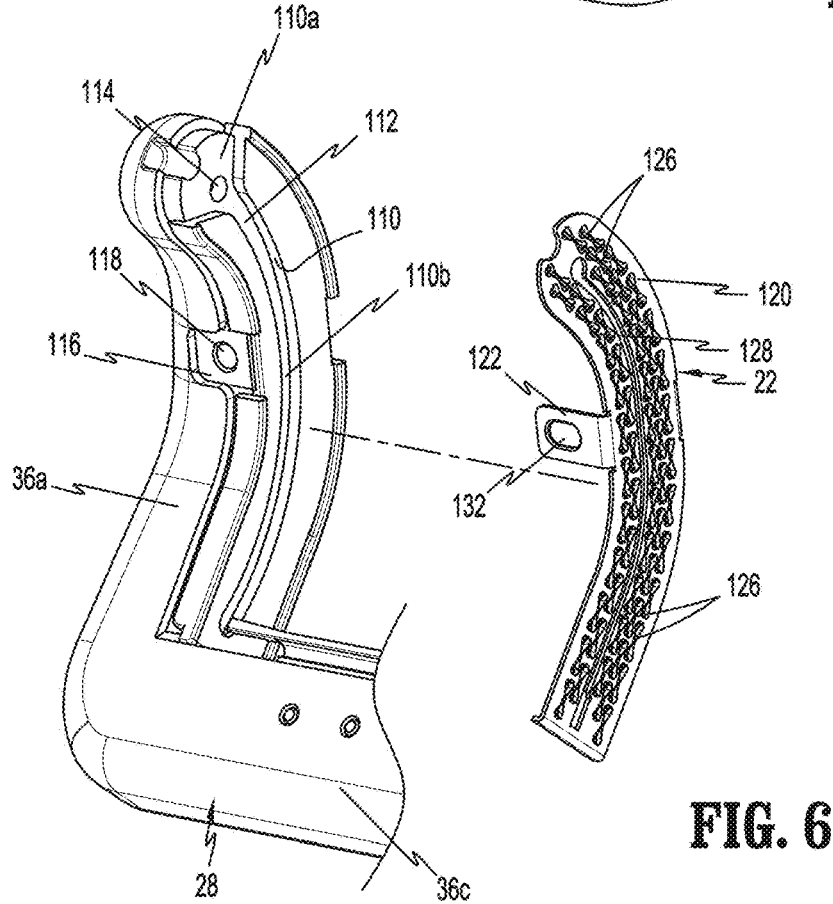
FIG. 6 is a side perspective view of the distal end portion of the stapling device shown in FIG. 5 with an anvil plate of the anvil assembly separated from the stapling device.
Figure 7:
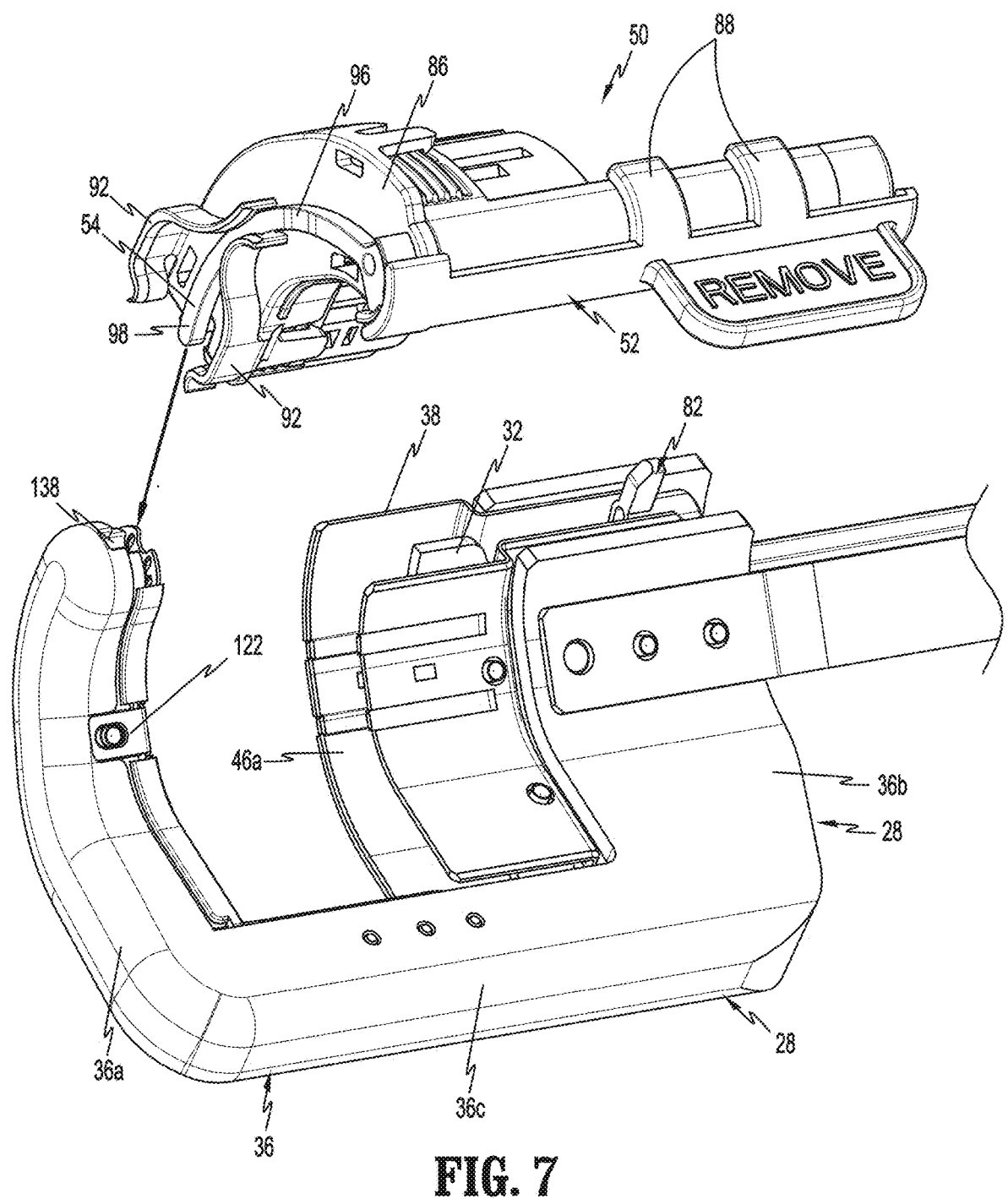
FIG. 7 is a side perspective view of the distal portion of the stapling device shown in FIG. 1 with the reload assembly supporting the shipping cap and separated from the clamp slide assembly of the stapling device.
Figure 8:
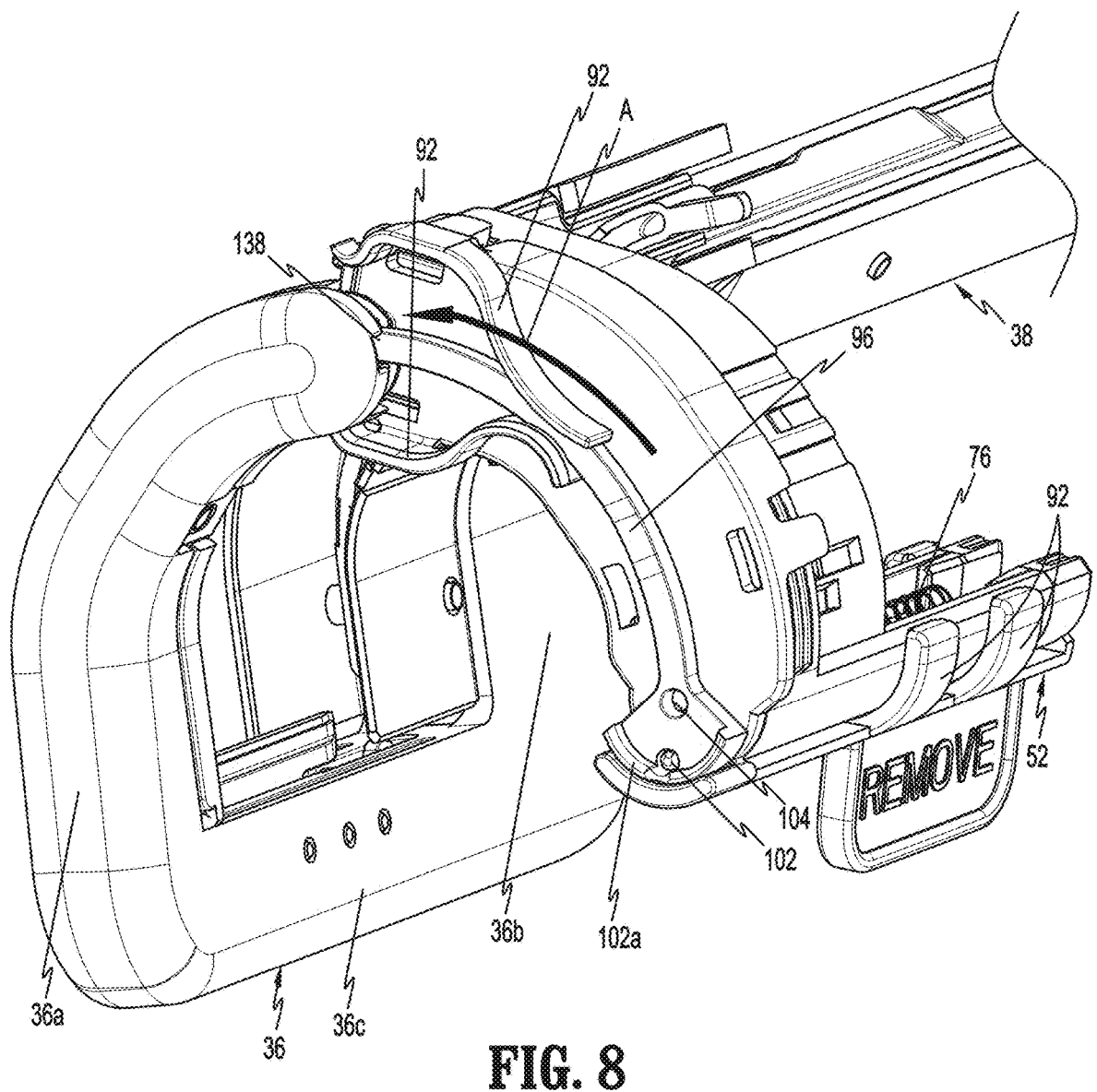
FIG. 8 is a side perspective view of the distal portion of the stapling device shown in FIG. 7 with the reload assembly as the reload assembly is positioned on the clamp slide assembly.

FIGS. 5 and 6 illustrate the distal transverse portion 36a of the frame assembly 28, which includes the anvil 22. The distal transverse portion 36a of the frame assembly 28 has a configuration that corresponds to the configuration of the cartridge assembly 20 and the anvil 22, e.g., curved and defines a curved channel 110 that includes a seat 112 that supports the cutting plate 54. The channel 110 includes an enlarged mouth 110a that tapers into a channel portion 110b of uniform width. The enlarged mouth 110a of the channel 110 defines a bore 114 that receives the alignment pin 70 when the alignment pin 70 is moved from a retracted position to an advanced position when the stapling device 10 is fired. The distal transverse portion 36a of the frame assembly 28 also defines a cutout 116 and a bore 118 positioned within the cutout 116.

The anvil 22 has a configuration that corresponds to the configuration of the distal transverse portion 36a of the frame 28 and the cartridge assembly 22, e.g., curved. The anvil 22 includes a proximally facing staple deforming surface 120 and a bracket 122. The staple deforming surface 120 defines rows of staple deforming pockets 126 and a knife blade slot 128 that extends between the rows of staple deforming slots 126. In some aspects of the disclosure, the staple deforming surface 120 includes 2 rows of staple deforming slots 126 on one side of the knife blade slot 128 and 3 rows of staple deforming slots 126 on the other side of the knife blade slot 128. Alternately, other arrays of staple deforming slots are envisioned. The bracket 122 is received in the cutout 116 of the frame assembly 28 and defines bore 132 that is aligned with the bore 118 in the distal transverse portion 36a of the frame assembly 28. The bores 118, 132 receive a pin or rivet (not shown) to secure the anvil 22 to the distal portion of the frame assembly 28. When the anvil 22 is secured to the distal transverse portion 36a of the frame assembly 28, the channel 110 is enclosed and is aligned with the knife blade slot 128. A channel inlet 138 (FIG. 5) is defined at one end of the anvil 22 and communicates with the mouth 110a of the channel 110.

Figure 9:
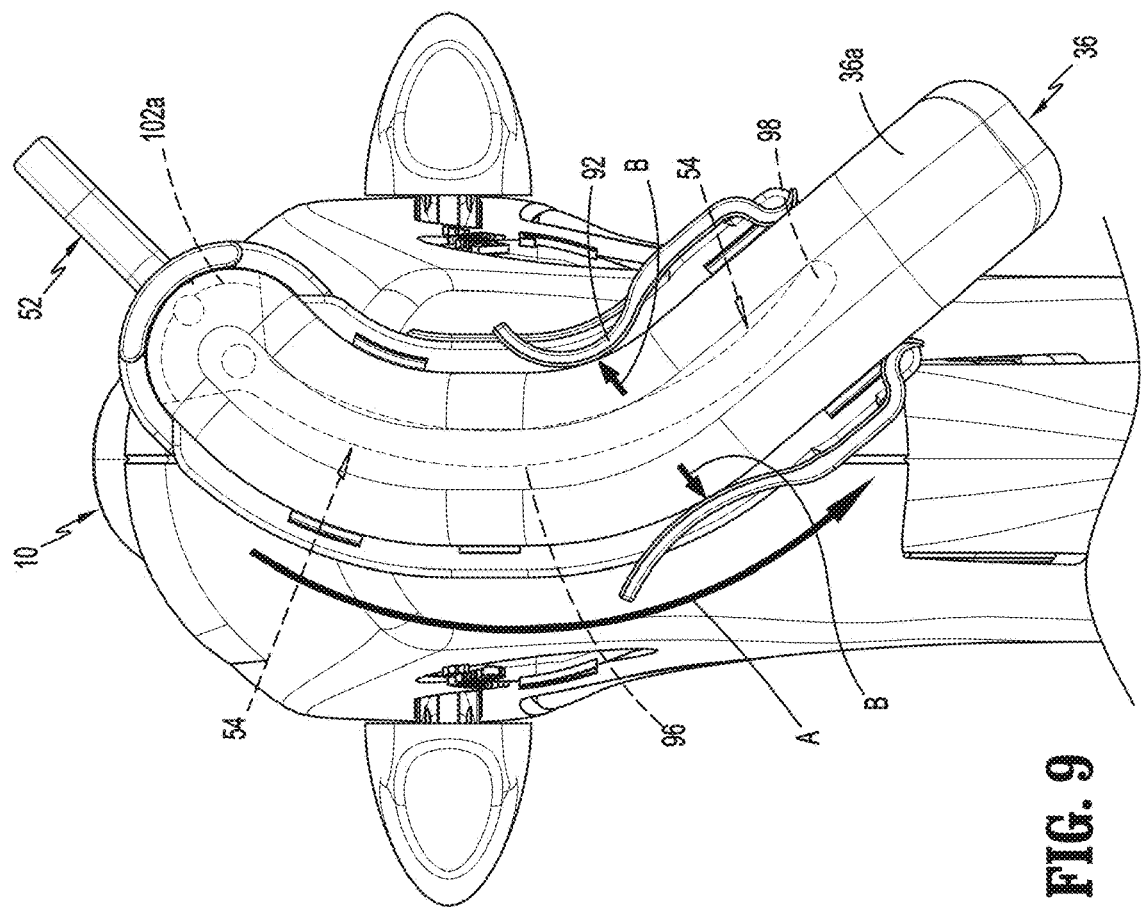
FIG. 9 is a perspective view from the distal end of the stapling device shown in FIG. 1 as the reload assembly is being positioned on the clamp slide assembly with the cutting plate of the reload assembly shown in phantom.

FIGS. 7-13 illustrate installation of the reload assembly 50 onto the stapling device 10. When the reload assembly 50 is installed onto the distal transverse portion 36a of the frame assembly 28 of the stapling device 10, the shipping cap 52 is supported on the cartridge assembly 20 with the cutting plate 54 received between the resilient fingers 92 of the shipping cap 52. The insertion end portion 98 of the cutting plate 54 is aligned with and the reload assembly 50 is rotated in the direction of arrow "A" in FIG. 8 onto the distal transverse portion 36a of the frame assembly 28. As the reload assembly 50 is rotated onto the distal transverse portion 36a of the frame assembly 28, the cutting plate 54 is inserted into and moves through the inlet 138 of the channel 110. As shown in FIG. 9, the resilient fingers 92 of the shipping cap 52 engage opposite sides of the distal transverse portion 36a of the frame assembly 28 and are deflected outwardly in the direction of arrows "B" to guide the reload assembly 50 onto the distal transverse portion 36a of the frame assembly 28. The reload assembly 50 is rotated onto the distal transverse portion 36a of the frame assembly 28 until the cartridge assembly 20 engages the central longitudinal portion 36c (FIG. 10) of the frame assembly 26 and the cap 102a (FIG. 8) of the cutting plate 54 covers the channel inlet 138 (FIG. 8) defined at the distal transverse portion 36a of the frame assembly 28.

Figure 11:
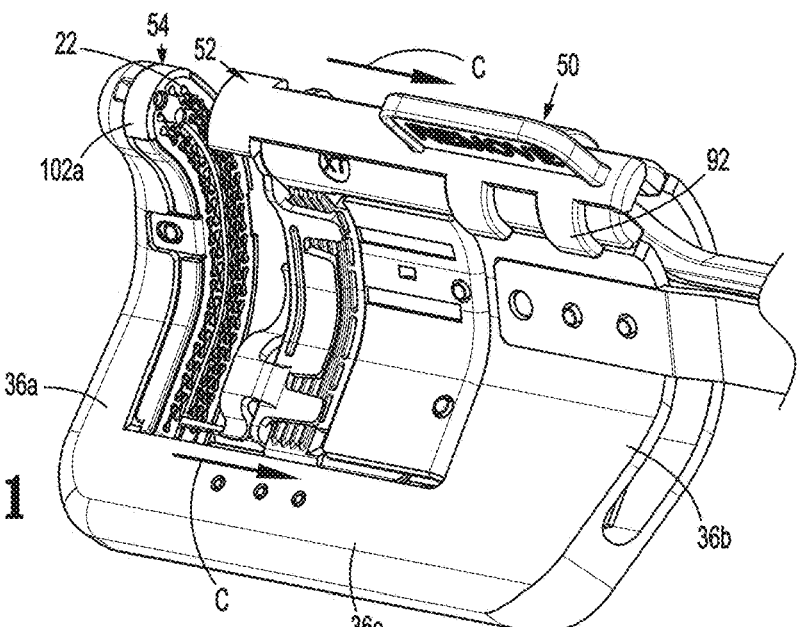
FIG. 11 is a side perspective view of the distal portion of the stapling device shown in FIG. 1 as the reload assembly continues to be installed onto the clamp slide assembly.
Figure 12:
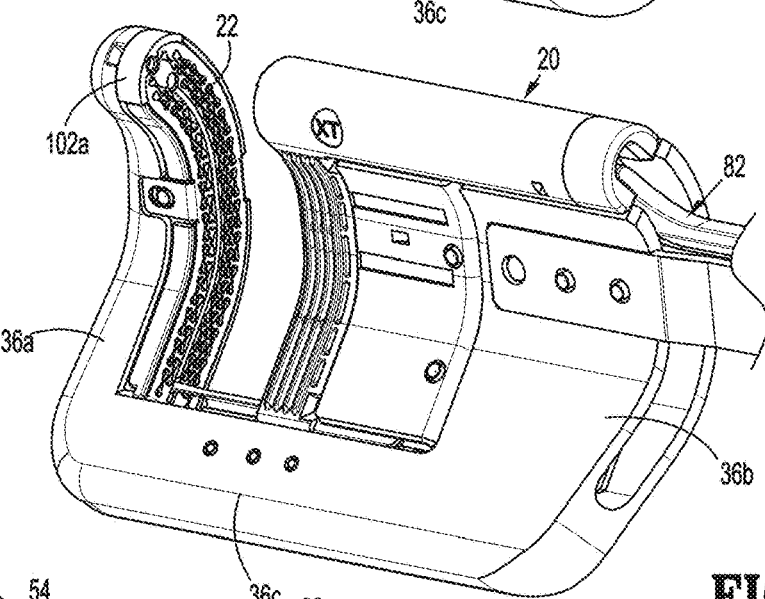
FIG. 12 is a side perspective view of the distal portion of the stapling device shown in FIG. 1 with the reload assembly fully installed on the clamp slide assembly.
Figure 13:
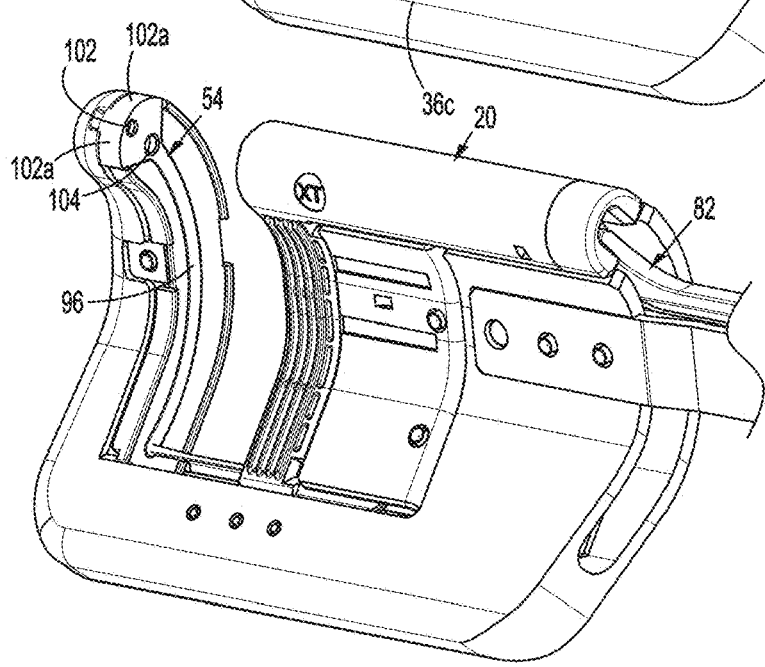
FIG. 13 is a side perspective view of the distal portion of the stapling device shown in FIG. 1 with the anvil plate of the anvil assembly removed and the reload assembly fully installed on the clamp slide assembly.

FIGS. 11-13 illustrate the reload assembly 50 as the reload assembly 50 is advanced and locked onto the stapling device 10. After the reload assembly 50 is rotated onto the distal transverse portion 36a of the frame assembly 28, the reload assembly 50 is moved proximally in the direction of the handle assembly 12 (FIG. 1) as indicated by arrows "C" in FIG. 11 into the pocket 46a (FIG. 5) of the distal end portion 46 of the clamp slide assembly 38 to move the knife holder 62b of the knife assembly 62 into engagement with the thrust bar 32 (FIG. 1). When the cartridge assembly 20 moves into the pocket 46a of the clamp slide assembly 38, the cutting plate 54 is retained within the anvil 22 and is separated from the shipping cap 52. As the cutting plate 54 separates from the shipping cap 52, the protrusion 90 (FIG. 4) of the shipping cap 52 is removed from the first opening 102 of the cutting plate 54. This allows the shipping cap 52 to be removed from the cartridge assembly 20.

Figure 14:
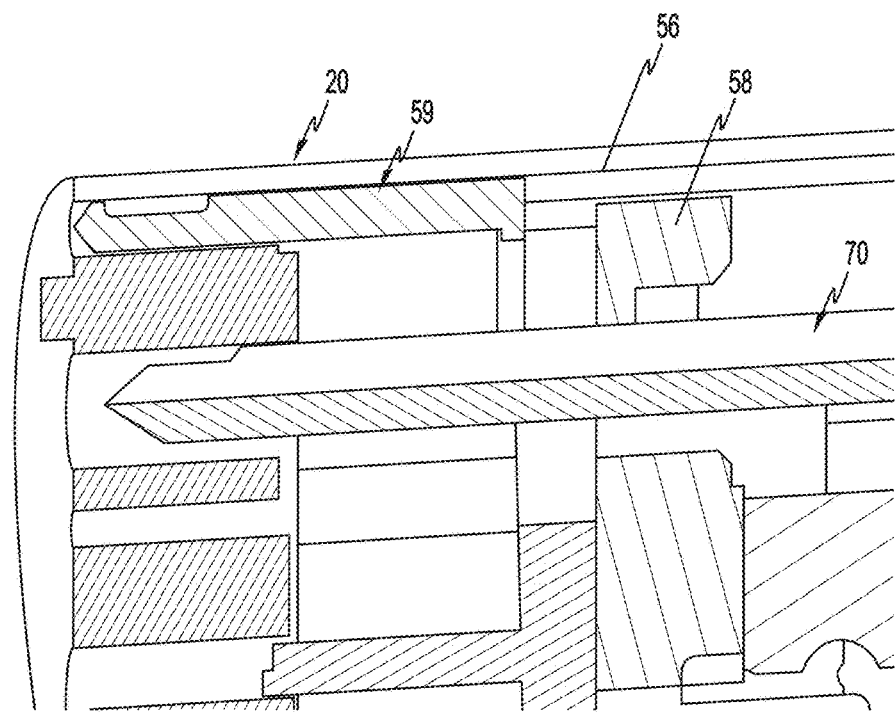
FIG. 14 is a cross-sectional view taken along section lines 14-14 of FIG. 4.
Figure 15:
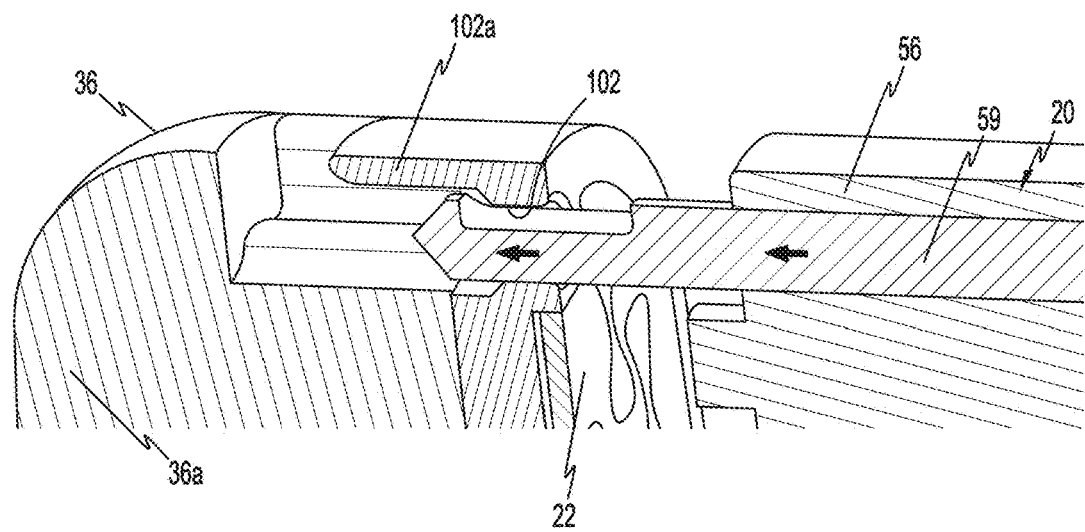
FIG. 15 is a side cross-sectional cutaway view of the distal portion of the stapling device shown in FIG. 1 with the stapling device in a fired position.

FIGS. 14 and 15 illustrate the cartridge assembly 20 as the cartridge assembly 20 is fired. When the cartridge assembly 20 is fired, the pusher 58 of the cartridge assembly 20, which is advanced within the cartridge body 56 to eject the staples 68 from the cartridge body 56, engages the cutting plate removal pin 59 to move the cutting pin removal pin 59 from a retracted position (FIG. 14) to an advanced position (FIG. 15) within the cartridge body 56 of the cartridge assembly 20. In the advanced position, the cutting plate removal pin 59 is received within the first opening 102 (FIG. 15) of the support end portion 100 of the cutting plate 54.

Figure 16:
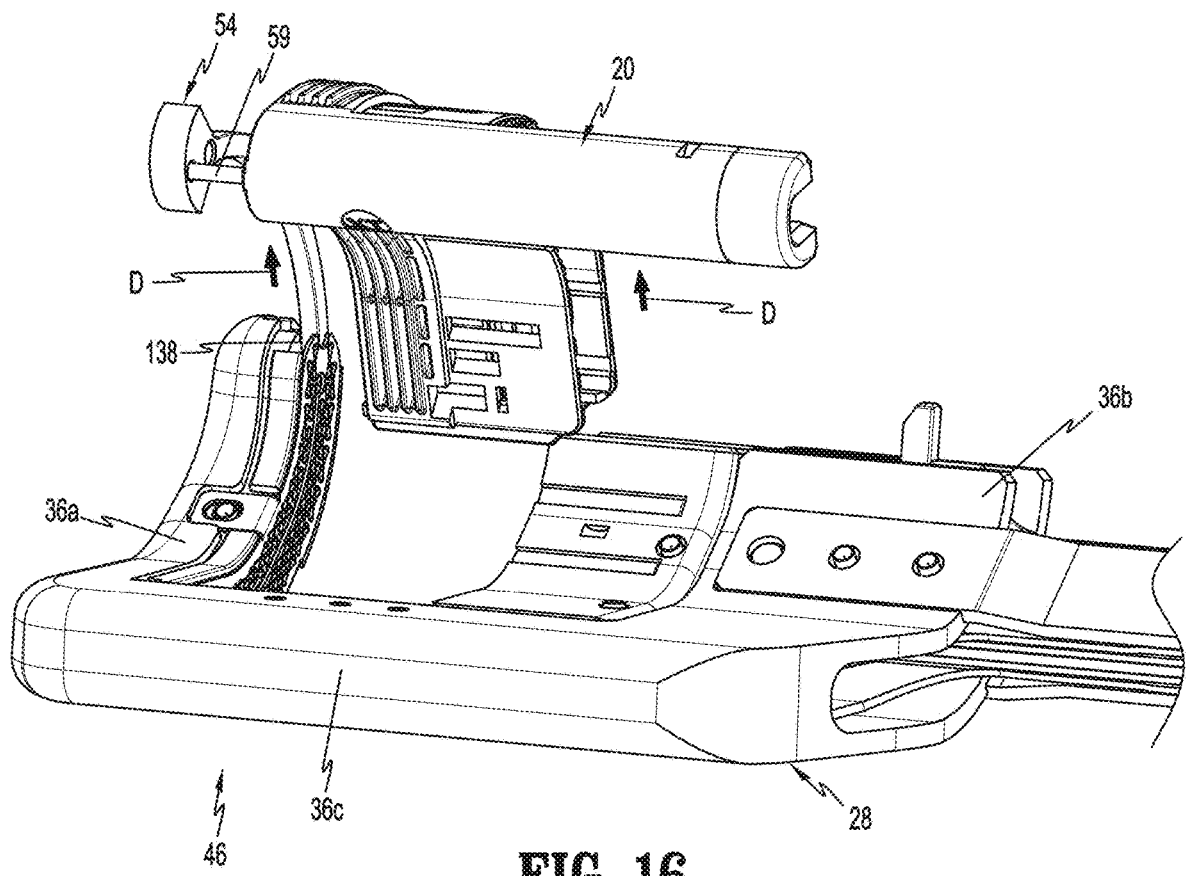
FIG. 16 is a side perspective view of the distal portion of the stapling device shown in FIG. 1 as the reload assembly is being removed from the clamp slide assembly.
Figure 17:
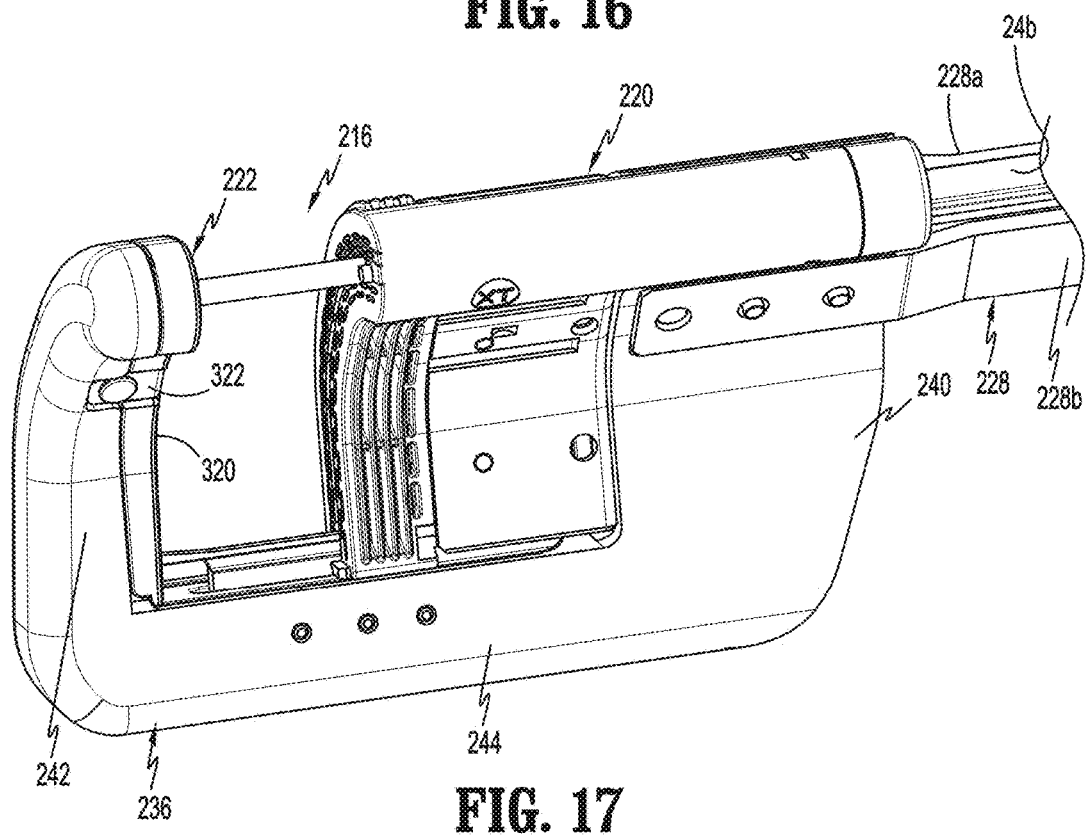
FIG. 17 is a side perspective view of a distal portion of another stapling device including other aspects of the disclosure with the stapling device in an unclamped position with an alignment pin of an alignment assembly in an advanced position.

FIG. 16 illustrates the distal end portion 46 of the stapling device 10 as the cartridge assembly 20 and cutting plate 54 are removed from the stapling device 10 in the direction indicated by arrows "D". As the cartridge assembly 20 is removed from the stapling device 10, the cutting plate removal pin 59 which extends through the first opening 102 of the cutting plate 54 as described above pulls the cutting plate 54 through the channel inlet 138 to remove the cutting plate 54 from the anvil assembly 22.

Figure 22:
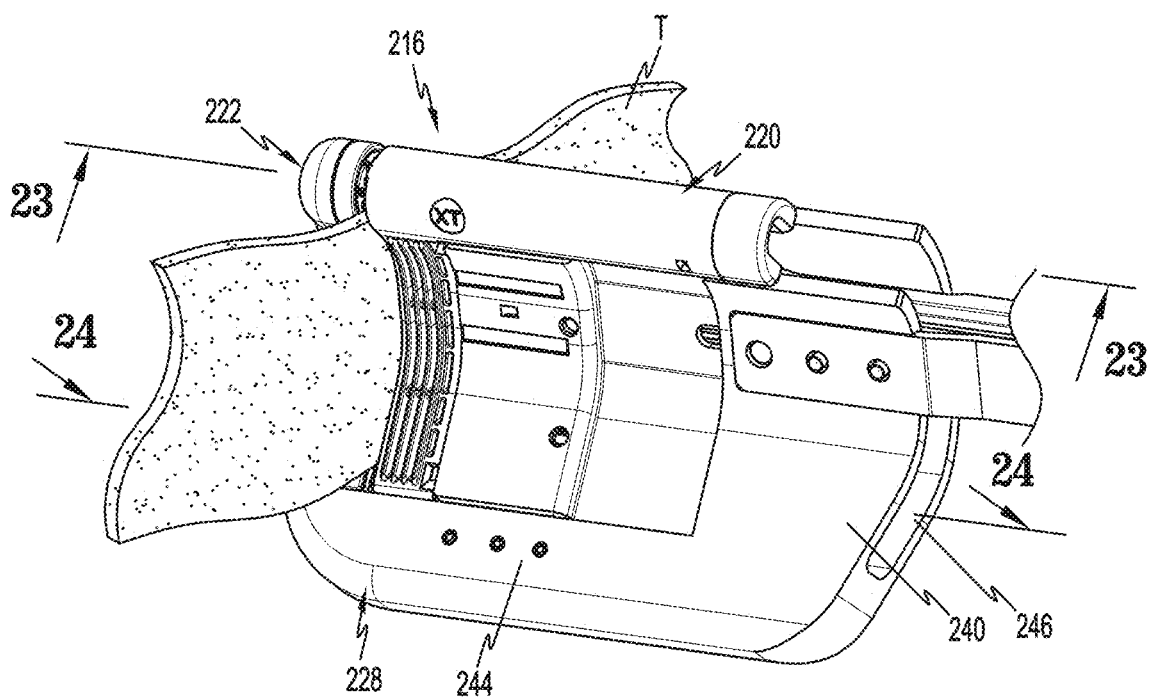
FIG. 22 is a side perspective view of the distal portion of the stapling device shown in FIG. 17 with the stapling device in the clamped and fired position with the knife blade in an advanced position.

FIGS. 17-24 illustrate a distal portion 236 (FIG. 18) of a frame assembly 228 of another exemplary stapling device of the disclosure including a tool assembly 216 (FIG. 22). The distal portion 236 of the frame assembly 228 includes spaced frame members 228a and 228b that define a channel 246. The distal portion 236 of the spaced frame members 228a, 228b form a proximal transverse portion 240, a distal transverse portion 242, and a central longitudinal portion 244. In aspects of the disclosure, the distal and proximal transverse portions 240, 242 of the distal portion 236 of the frame assembly 228 have a curved configuration as described above in regard to distal portion 36 of the frame assembly 28 (FIG. 1.) Alternately, the distal and proximal transverse portions 240, 242 of the distal portion 236 of the frame assembly 228 may be substantially linear.

Figure 18:
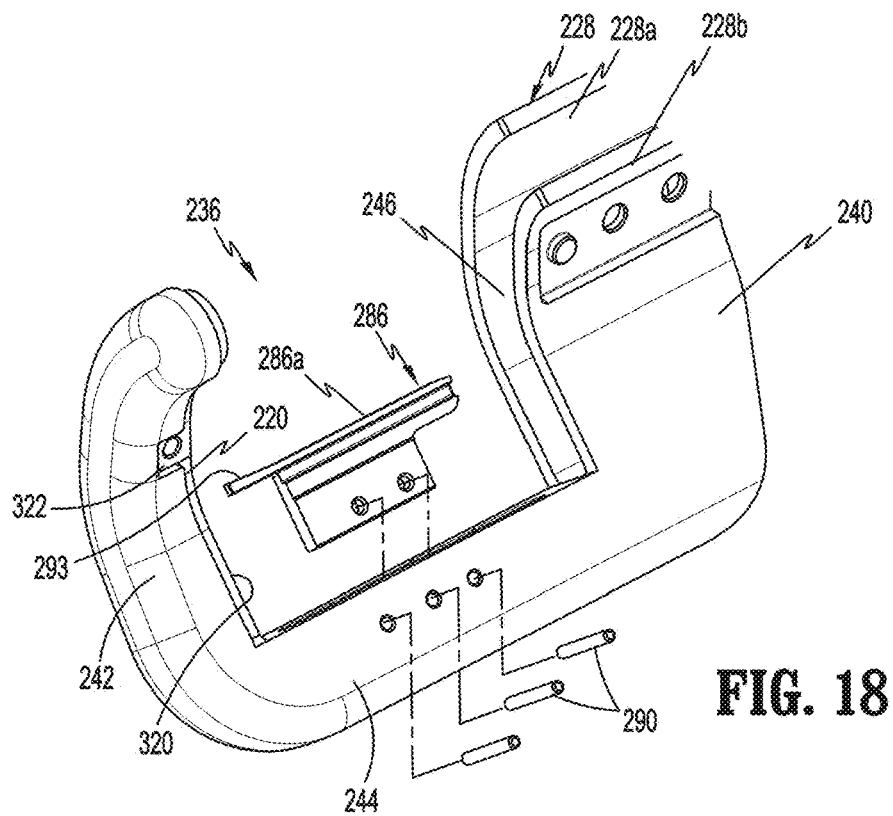
FIG. 18 is a side perspective view of a distal frame portion of a frame assembly of the distal portion of the stapling device shown in FIG. 17 with a knife guide plate separated from the distal frame portion.

The tool assembly 216 is supported on the distal portion 236 of the frame assembly 228 and includes a cartridge assembly 220 and an anvil 222. As described in regard to anvil 22 (FIG. 6) of stapling device 10 (FIG. 1), the anvil 222 has a configuration that corresponds to the configuration of the distal transverse portion 240 of the frame 228. The anvil 222 includes a proximally facing staple deforming surface 320 (FIG. 18) and is supported on the distal transverse portion 240 of the frame assembly 228 by a bracket 322 (FIG. 18). The staple deforming surface 320 defines rows of staple deforming pockets (not shown) and a knife blade slot that extends between the rows of staple deforming slots as described above in regard to anvil 22 (FIG. 6).

The cartridge assembly 220 (FIG. 22) is substantially as described above in regard to cartridge assembly 20 (FIG. 4) and includes, inter alia, a pusher 258 (FIG. 23), and a knife assembly 262 including a knife blade 262a (FIG. 21) and a knife holder 262b (FIG. 4). The knife blade 262 (FIG. 21) is secured to the knife holder 262b (FIG. 23) and includes a body 264 having a distal cutting edge 266 and sides that include lateral extensions 268a and 268b.

The central longitudinal portion 244 of the frame assembly 228 supports a guide plate 286 (FIG. 18) that is positioned between the distal transverse portion 240 of the frame assembly 228 and the proximal transverse portion 242 of the frame assembly 228. In aspects of the disclosure the guide plate 286 is secured to the central longitudinal portion 244 of the frame assembly 228 using rivets 290, screws, or the like and includes a guide surface 286a that faces away from the central longitudinal portion 244 towards the cartridge assembly 220 (FIG. 22). In some aspects of the disclosure the guide surface 286a has a proximal portion that is substantially flat and linear and a distal portion defining a tapered surface 293 that is angled inwardly towards the cartridge assembly 220 in the distal direction. The tapered surface 293 is supported in cantilevered fashion on the guide plate 286.

Figure 19:
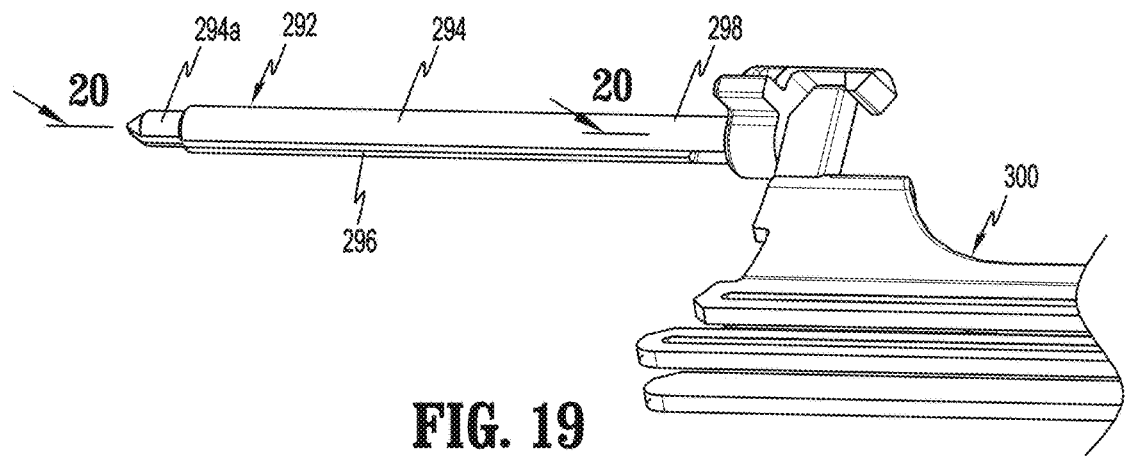
FIG. 19 is a side perspective cutaway view of an alignment pin of the alignment pin assembly of the distal portion of the of the stapling device shown in FIG. 17.
Figure 20:
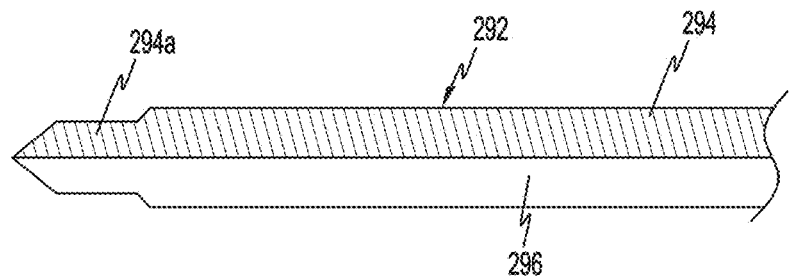
FIG. 20 is a cross-sectional view taken along section line 20-20 of FIG. 19.
Figure 21:
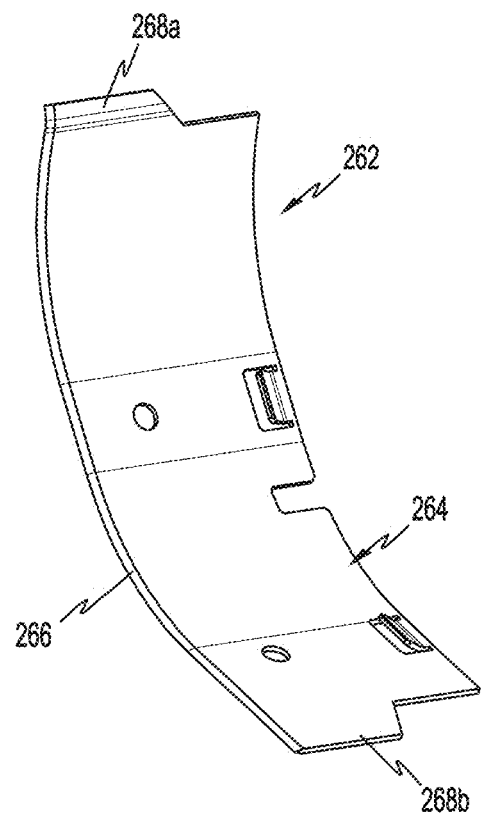
FIG. 21 is a side perspective view of the distal portion of the stapling device shown in FIG. 17.

The cartridge assembly 220 includes an alignment pin 292 illustrated in FIGS. 19 and 20. The alignment pin 292 is similar to the alignment pin 70 (FIG. 4) described above and includes a body 294 having a tip 294a of reduced diameter that is configured to engage the anvil 222 and a proximal portion 298 that is coupled to an alignment pin pusher 300 (FIG. 19) of the stapling device 10 (FIG. 1.) The body 294 of the alignment pin 292 also defines a longitudinal slot or channel 296 that extends along the length of the alignment pin 292.

FIGS. 23 and 24 illustrate the tool assembly 216 as the tool assembly 216 is fired. As illustrated, the lateral extension 268a of the knife blade 262 is received in the longitudinal slot 296 of the alignment pin 292 and the lateral extension 268b of the knife blade 262 is engaged with the guide surface 286a of the guide plate 286. As the knife blade 262 is advanced from the cartridge assembly 220 from its retracted position to its advanced position in the direction indicated by arrows "E", receipt of the lateral extension 268a of the knife blade 262 within the longitudinal slot 296 of the alignment pin 292 and engagement between the lateral extension 268b of the knife blade 262 and the guide surface 286a of the guide plate 286 retains tissue "T" in the path of the knife blade 262 to improve the likelihood that the tissue is cleanly transected or resected. When the knife lateral extension 268b of the knife blade 262 engages the tapered surface 293 of the guide plate 286, the distal portion of the guide plate 286 supporting the tapered surface 293 is deflected downwardly by the lateral extension 286b. The distal portion of the guide plate 286 will return to its non-deflected position when the knife blade 262 is retracted in position for additional firings of the stapling device.

Persons skilled in the art will understand that the devices and methods specifically described herein and illustrated in the accompanying drawings are non-limiting exemplary aspects of the disclosure. It is envisioned that the elements and features illustrated or described in connection with one exemplary embodiment may be combined with the elements and features of another without departing from the scope of the present disclosure. As well, one skilled in the art will appreciate further features and advantages of the disclosure based on the above-described aspects of the disclosure. Accordingly, the disclosure is not to be limited by what has been particularly shown and described, except as indicated by the appended claims.

What is claimed is:

1. A stapling device comprising:
    a frame defining a longitudinal axis, the frame including a distal transverse portion, a proximal transverse portion, and a central longitudinal portion extending between the distal and proximal transverse portions, the distal transverse portion of the frame defining a channel;
    an approximation assembly supported on the frame, the approximation assembly including a clamp slide assembly having a distal portion defining a pocket, the clamp slide assembly movable in relation to the frame from a retracted position to an advanced position;
    an anvil fixedly secured to the distal transverse portion of the frame over the channel, the anvil and the channel defining a channel inlet; and
    a reload assembly including a cartridge assembly with a pusher and a cutting plate removal pin engageable with the pusher, and a cutting plate supported on the cartridge assembly, the reload assembly being removably supported on the stapling device to position the cartridge assembly in the pocket of the clamp slide assembly and to position the cutting plate in the channel of the distal transverse portion of the frame;

with the pusher being movable longitudinally from a retracted position to an advanced position for ejecting staples, and with the cutting plate removal pin being movable longitudinally for engagement with the cutting plate;

wherein the pusher is positioned to engage the cutting plate removal pin as the pusher is moved from its retracted position to its advanced position to move the cutting plate removal pin from its retracted position to its advanced position.

2. The stapling device of claim 1, wherein the cartridge assembly defines rows of staple pockets and a staple supported in each of the staple pockets.

3. The stapling device of claim 2, wherein the reload assembly includes a shipping cap that is supported on the cartridge assembly, the shipping cap positioned over the rows of staple pockets to prevent the staples from being ejected from the rows of staple pockets.

4. The stapling device of claim 3, wherein the shipping cap includes a distal surface having a protrusion and the cutting plate defines a first opening, the protrusion received in the first opening to support the cutting plate on the shipping cap.

5. The stapling device of claim 4, wherein the shipping cap includes resilient fingers defining a guide channel, the guide channel positioned to receive the distal transverse portion of the frame during installation of the reload assembly onto the clamp slide assembly to guide the cutting plate into the channel inlet.

6. The stapling device of claim 1, wherein the cutting plate removal pin is movable from a retracted position disengaged from the cutting plate to an advanced position engaged with the cutting plate, wherein in the advanced position of the cutting plate removal pin, removal of the cartridge assembly from the clamp slide assembly effects removal of the cutting plate from the channel of the distal transverse portion of the frame.

7. The stapling device of claim 6, wherein the cutting plate defines a second opening that receives the cutting plate removal pin when the cutting plate removal pin is in its advanced position.

8. The stapling device of claim 1, further including a handle assembly, the frame extending distally from the handle assembly.

9. The stapling device of claim 1, wherein the distal and proximal transverse portions are curved along an axis transverse to the longitudinal axis.

10. The stapling device of claim 1, wherein movement of the clamp slide assembly from its retracted position to its advanced position effects movement of the cartridge assembly in relation to the anvil from an open position to a clamped position.

11. A stapling device comprising:
a frame defining a longitudinal axis, the frame including a distal transverse portion, a proximal transverse portion, and a central longitudinal portion extending between the distal and proximal transverse portions, the distal transverse portion of the frame defining a channel;

an approximation assembly supported on the frame, the approximation assembly including a clamp slide assembly having a distal portion defining a pocket, the clamp slide assembly movable in relation to the frame from a retracted position to an advanced position;

an anvil fixedly secured to the distal transverse portion of the frame over the channel, the anvil and the channel defining a channel inlet; and a reload assembly including a cartridge assembly with a pusher and a cutting plate removal pin engageable with the pusher, a shipping cap, and a cutting plate, the shipping cap supported on the cartridge assembly and the cutting plate supported on the shipping cap, the reload assembly being removably supported on the stapling device to position the cartridge assembly in the pocket of the clamp slide assembly and to position the cutting plate in the channel of the distal transverse portion of the frame;

with the pusher being movable longitudinally from a retracted position to an advanced position for ejecting staples, and with the cutting plate removal pin being movable longitudinally for engagement with the cutting plate;

wherein the pusher is positioned to engage the cutting plate removal pin as the pusher is moved from its retracted position to its advanced position to move the cutting plate removal pin from its retracted position to its advanced position.

12. The stapling device of claim 11, wherein the shipping cap includes a distal surface having a protrusion and the cutting plate defines a first opening, the protrusion received in the first opening to support the cutting plate on the shipping cap.

13. The stapling device of claim 12, wherein the shipping cap includes resilient fingers defining a guide channel, the guide channel positioned to receive the distal transverse portion of the frame during installation of the reload assembly onto the clamp slide assembly to guide the cutting plate into the channel inlet of the channel.

14. The stapling device of claim 13, wherein the cutting plate removal pin is movable from a retracted position disengaged from the cutting plate to an advanced position engaged with the cutting plate, wherein in the advanced position of the cutting plate removal pin, removal of the cartridge assembly from the clamp slide assembly effects removal of the cutting plate from the channel of the distal transverse portion of the frame.

\* \* \* \* \*